US007012937B2

(12) United States Patent
Beidas et al.

(10) Patent No.: US 7,012,937 B2
(45) Date of Patent: Mar. 14, 2006

(54) METHOD AND APPARATUS FOR TRACKING A SYNCHRONIZATION SIGNAL

(75) Inventors: Bassel Beidas, Alexandria, VA (US); Olga Ritterbush, Rockville, MD (US); Stanley Kay, Rockville, MD (US); Yezdi Antia, Gaithersburg, MD (US); Bala Subramaniam, Potomac, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1022 days.

(21) Appl. No.: 09/768,728

(22) Filed: Jan. 24, 2001

(65) Prior Publication Data

US 2002/0012363 A1   Jan. 31, 2002

Related U.S. Application Data

(60) Provisional application No. 60/214,163, filed on Jun. 26, 2000.

(51) Int. Cl.
   *H04J 3/06*   (2006.01)
(52) U.S. Cl. .................. 370/509; 370/512; 370/516
(58) Field of Classification Search ................ 370/315, 370/316, 324, 350, 503, 509, 516, 527, 528, 370/529; 329/325; 368/52; 455/13.2
   See application file for complete search history.

(56) References Cited

U.S. PATENT DOCUMENTS

| 5,414,741 | A  | * | 5/1995  | Johnson ....................... 375/376 |
| 5,809,064 | A  | * | 9/1998  | Fenton et al. ................ 375/150 |
| 6,169,514 | B1 | * | 1/2001  | Sullivan ................. 342/357.05 |
| 6,633,255 | B1 | * | 10/2003 | Krasner ................. 342/357.12 |

* cited by examiner

*Primary Examiner*—Chi Pham
*Assistant Examiner*—Rhonda Murphy
(74) *Attorney, Agent, or Firm*—Craig Plastrik

(57) ABSTRACT

A method and system for tracking a time division multiplexed synchronization signal in a satellite communication system is provided. The signal is provided as a series of frames with beacon signals time division multiplexed into at least one time slot of each frame. The beacon signal in each frame comprises a unique word sequence, which is the same in each frame, and a portion of a PN sequence. The entire PN sequence is distributed into a plurality of frames forming a superframe. Frequency variations of the incoming signal are tracked at the satellite terminal by correlating the PN sequence of the incoming signal against early and late locally generated versions of the PN sequence in a discriminate circuit. The output of the discriminate is provided to a delay locked loop circuit of at least third order. The output of the loop is used to adjust the frequency of the VCO, which clocks the A/D converter operating on the incoming signal. The product of the PN sequence of the incoming signal and an on-time locally generated version of the PN sequence is provided to an FFT circuit. The satellite terminal determines if it is locked onto the incoming signal based on the output of the FFT. If the satellite terminal is not locked, the terminal returns to an acquisition mode.

9 Claims, 22 Drawing Sheets

AGC Block Diagram $t_{UW}^N$=detected UW reference in frame N.

METHOD AND APPARATUS FOR TRACKING A SYNCHRONIZATION SIGNAL

This application claims the benefit of priority under 35 U.S.C. § 119(e) to U.S. patent application Ser. No. 60/214,163 filed Jun. 26, 2000.

BACKGROUND OF THE INVENTION

1. Field of the Invention

The present invention relates to a method and system for synchronizing downlink and uplink signals between a satellite and satellite terminals in a satellite communication system. More particularly, the present invention relates to a method and system for synchronizing downlink and uplink signals between a satellite and satellite terminals in a satellite communication system using a discontinuous synchronization signal embedded within frames of the downlink signal.

2. Description of the Related Art

Society has an ever increasing appetite for the exchange of information. A number of communication systems exist which attempt to satisfy society's communications needs. A useful communication system should be reliable, inexpensive and available to a wide percentage of the population, even in geographically remote areas. Existing communication systems each have disadvantages. For example, digital subscriber line (xDSL) services have been proposed to accommodate the transport of digitized voice and data on analog telephone lines. However, difficulties have been experienced with insuring that xDSL services consistently deliver the bandwidth that is requested by users.

In addition, large populations exist that do not have access to plain old telephone service (POTS). Furthermore, even where POTS is available, xDSL services may not be available because of the distance between a consumer and a central office, or because of problems with noise on the analog telephone line. Some cable companies offer high speed internet services over existing cable networks. However, access to cable internet service, like DSL, is limited to geographic regions where the infrastructure exists. Furthermore, it would be extremely expensive to build the infrastructure for telephone or cable service in such geographically remote areas.

Other examples of communication systems include wireless networks to provide for the transmission of packetized data over cellular voice networks, personal communication systems (PCS), and point-to-multipoint systems for broadband wireless network access. These systems are disadvantageous in that they limit users delivery options. For example, cellular voice networks are limited to voice communications and personal communication systems provide access to either very limited information or provide internet access at relatively slow data rates compared to even dial-up connections. Furthermore, cellular and PCS systems are still geographically limited to locations where the cellular infrastructure exists.

Satellite communication systems are advantageous because they can serve an extremely wide geographic region. For example, a single geosynchronous satellite may service the entire North American continent. Very small aperture terminal (VSAT) satellite networks provide business enterprises and other organizations with local area network (LAN) internetworking, batch and interactive transmission service, interactive voice, broadcast data and voice communications, multimedia image transfer service, and other services, between a number of sites equipped with VSATs and a site designated as their headquarters. Some existing VSAT satellite networks, however, are disadvantageous in that they typically use large antennas, require double satellite hops through a central hub for VSAT to VSAT data transfers, and transmit and receive at relatively low data rates. Other satellite systems provide only push internet service to consumers (i.e. access to selected information available via internet) and not full access to all internet information and full connectivity.

There is therefore a need for a satellite communication system that overcomes the above-listed disadvantages. Such a system should provide broadband multimedia services to an individual or entity within the geographic area covered by the satellite. In the case of a geosynchronic satellite, customers in the northern hemisphere should require only a clear view of the southern sky and a satellite terminal capable of receiving from and transmitting to the satellite.

Two very important considerations in a two-way satellite communication system will be the system's capacity and the cost of the satellite terminals. The capacity of the system is determined by the frequency band allocated to the system. For Ka band Fixed Satellite Services, a contiguous spectrum of 500 MHz is typically allocated for the downlink as well as the uplink. The capacity of the system is increased by dividing the coverage area into geographically distinct uplink and downlink cells. Multiple modulators and beam shaping is utilized on the satellite to limit the coverage of each beam to a particular cell or group of cells. In this manner, the allocated spectrum may be reused in geographically distinct areas. However, using multiple modulators increases the complexity of a satellite. Therefore, there is a need to reduce the complexity of the satellite where possible.

In addition, the cost of satellite terminals (ST) should be kept to a minimum. Because many STs will be present within each uplink and downlink cell, each uplink cell is typically assigned to a particular sub-band of the allocated spectrum, and each ST within the uplink cell is typically assigned to a particular time slot. Thus, it is critical to the functioning of the system for the STs to be synchronized in both timing and frequency with the satellite. Traditional satellite systems incorporate a beacon signal on a separate carrier frequency in order to synchronize the ST with the satellite. However, providing a beacon signal on a separate carrier requires an additional modulator on the satellite and additional hardware for demodulating at the ST. This adds unwanted cost and complexity to the system. Therefore, there is a need to provide a means for synchronizing STs with the satellite to a high degree of accuracy while at the same time reducing the cost and complexity of the STs and the satellite.

SUMMARY OF THE INVENTION

It is an object of the present invention to provide a satellite communication system including at least one satellite that transmits signals to and receives signals from a plurality of satellite terminals. The satellite terminals will be synchronized with the satellite. It is another object of the invention to allow the satellite to have reduced complexity by reducing the number of modulators. It is a further object of the invention to provide satellite terminals with a means for tracking frequency and phase shifts in a TDM synchronization signal from a satellite. The above listed objects are accomplished by providing a system and method of time division multiplexing a beacon signal into downlink frames of a communication signal on a single carrier.

One embodiment of the present invention provides a system and method for tracking the frequency at which a satellite terminal receives a signal. The terminal includes a delay lock loop circuit, and the terminal provides the signal to the delay lock loop circuit, which in turn provides an output representing the phase delay of the signal. The output of the delay lock loop may be used to adjust the clock rate of the receiving terminal, so that the clock rate tracks the frequency of the received signal. In order to track the frequency of the received signal with the required accuracy, the delay lock loop circuit comprises at least a third order tracking loop. Where the error signal is too great, third order loops produce undesirable transient responses, therefore the delay lock loop circuit may further comprise a simple gain tracking loop. The delay lock loop circuit may thus be controlled by initially using a simple gain tracking loop and subsequently using the at least third order tracking loop once the error has been reduced to an acceptable level.

Furthermore, the system and method may use the simple gain tracking loop until the difference between the actual frequency and the expected frequency is below a threshold value, and thereafter use the (at least) third order tracking loop. Alternatively, the simple gain tracking loop may be used for a set period of time before the third order tracking loop is used.

Another embodiment of the present invention provides a system and method of maintaining synchronization at a terminal adapted for use in a satellite communication system. A signal comprising a plurality of frames is received at a terminal, with each frame (or periodic frames) comprising a known sequence being time division multiplexed therein. A substantially similar sequence is generated at the receiver and the product of the received signal with the locally generated sequence is received by an FFT circuit. The output of the FFT circuit determines an offset between the local clock rate and the frequency of the received signal. If the offset is below a threshold value, then the system remains in the tracking mode. However, if the offset is too large, the system reverts to an acquisition mode.

BRIEF DESCRIPTION OF THE DRAWINGS

The various aspects, advantages and novel features of the present invention will be more literally comprehended from the following detailed description when read in conjunction with the appended drawings, in which.

DETAILED DESCRIPTION OF THE PREFERRED EMBODIMENTS

Figure 1:
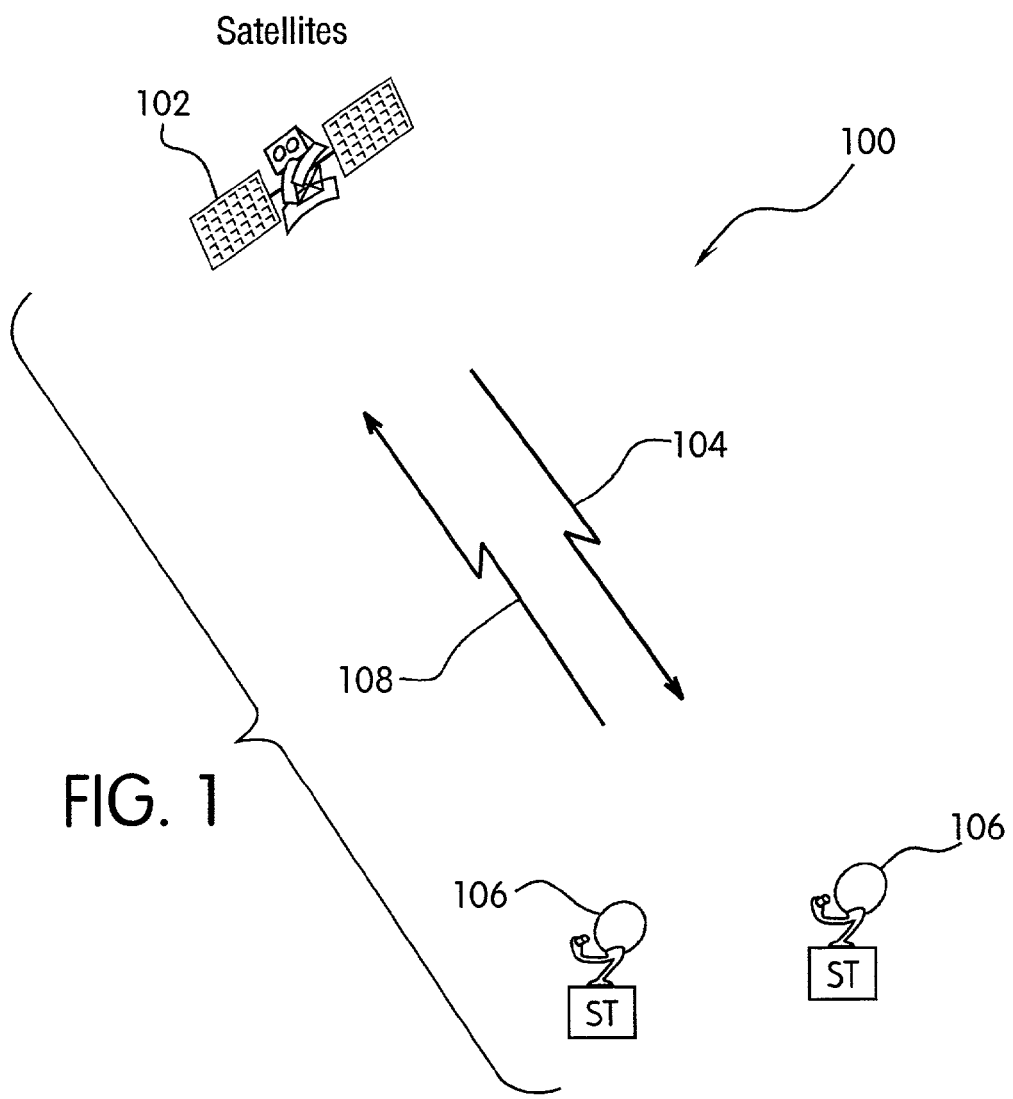
FIG. 1 illustrates an example of a satellite communication system which employs an embodiment of the present invention for acquiring and tracking communication signals.

A satellite communications system 100 employing an embodiment of the present invention is shown in FIG. 1. The system 100 includes at least one satellite 102, such as a geosynchronous earth orbit (GEO) satellite, that transmits downlink signals 104 to a plurality of satellite terminals (ST's) 106. The STs 106 in turn transmit uplink signals 108 to the satellite 102. The uplink signals 108 from the multiple STs 106 are transmitted over the same carrier signal in a time division multiplexed manner in order not to interfere with one another. Therefore, in order for the satellite communications system to function properly, the STs 106 must be synchronized to the satellite and to each other.

In accordance with an embodiment of the present invention, synchronization can be accomplished through the use of a beacon signal incorporated into the downlink signal 104. The downlink signal is time divided into frames, preferably 3 msec frames, with each frame further divided into time slots. At least one time slot, preferably the first time slot, in each frame contains the beacon signal, which will be described in further detail below. The STs 106 receive the beacon signal, and in combination with satellite ephemeris information are able to coordinate their respective transmissions of their respective uplink signals so that they arrive at the satellite 102 in their respective assigned time slots.

Figure 2:
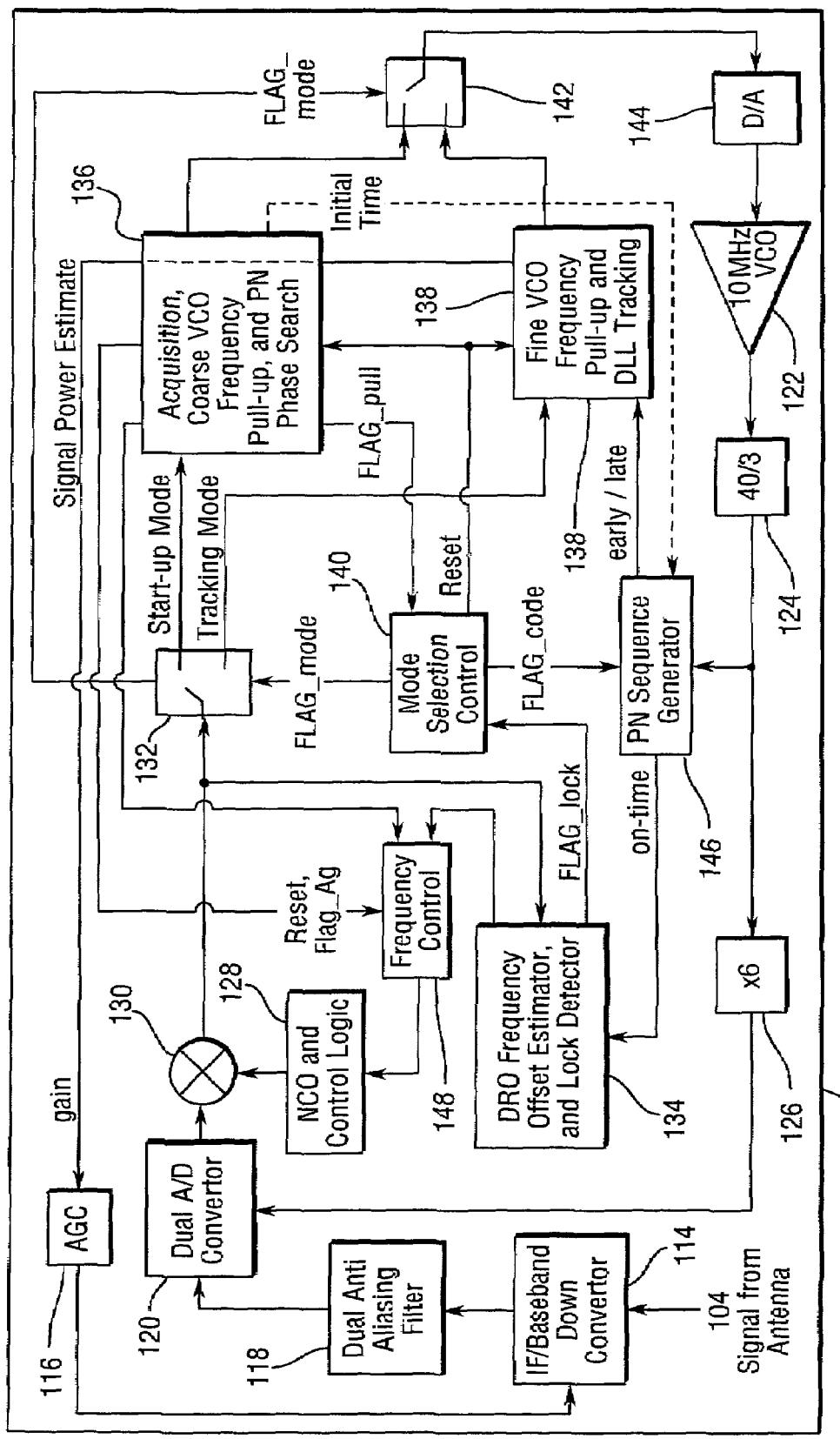
FIG. 2 is a block diagram illustrating the exemplary components of a satellite terminal employed in the system shown in FIG. 1 in accordance with an embodiment of the present invention.

Each ST 106 contains a beacon demodulator 112 as shown in FIG. 2. The ST 106 receives the downlink signal 104 and delivers it to a beacon demodulator 112 at an IF/baseband down-converter 114. An automatic gain control circuit 116 (AGC) controls the gain applied to the signal at the IF/baseband down-converter 114. The signal 104 is then filtered in dual anti-aliasing filter 118 and passed to dual A/D converter 120. The A/D converter 120 converts the analog wave form 104 into digital samples, such as for example six bit samples, at a rate determined by a 10 MHz VCO 122. Specifically, the 10 MHz clock signal produced by VCO 122 is first increased to 133.33 MHz by a 40/3 frequency multiplier 124, and then up to the 800 MHz sampling rate by a ×6 frequency multiplier 126. The 800 MHz clock received by A/D converter 120 causes the converter 120 to produce six samples per QPSK symbol (the satellite 102 transmits 133.33 million QPSK symbols per second, thus the 800 MHz clock produces six samples per QPSK symbol received) of the received signal 104.

As further shown, the output of dual A/D converter 120 is combined with the output of NCO and Control Logic Block 128 at multiplier 130. The output of multiplier 130 is received by a mode switch 132 and by a DRO Frequency Offset Estimator and Lock Detector 134, the details of which are described below. The samples received at the mode switch 132 from the multiplier 130 are sent to either an acquisition block 136 or a tracking block 138 based on a control signal received at mode switch 132 from mode selection control block 140. The output of the acquisition block 136 or the tracking block 138 is sent to a second mode switch 142 which in turn passes the output to a digital to analog converter 144. The output of digital to analog converter 144 adjusts the frequency of the VCO 122.

The beacon demodulator 112 further includes a PN sequence generator 146 which provides an on-time PN sequence signal to DRO Frequency Offset Estimator and Lock Detector 134, and both early and late PN sequence signals to the tracking block 138. The PN sequence generator block 146 is clocked by the output of the 40/3 block 124, once per received QPSK symbol. Furthermore, the PN sequence generator block 146 receives a control signal from the mode selection control block 140.

The beacon demodulator 112 further includes a frequency control block 148. The frequency control block 148 receives control signals from the DRO frequency offset estimator, and lock detector 134 and from the acquisition block 136. The frequency control 148 also provides an output which is received by the NCO and control logic block 128 and used to adjust the frequency at the NCO and control logic block 128.

The mode selection control block 140 provides a reset signal to the acquisition block 136, the tracking block 138 and frequency control block 148. The mode selection control block also receives a control signal from DRO frequency offset estimator, and lock detector 134. Finally, AGC 116 receives a control signal from either the acquisition block 136 or the tracking block 138 depending on the status of the mode selection control block 140 and mode switch 132.

Figure 3:
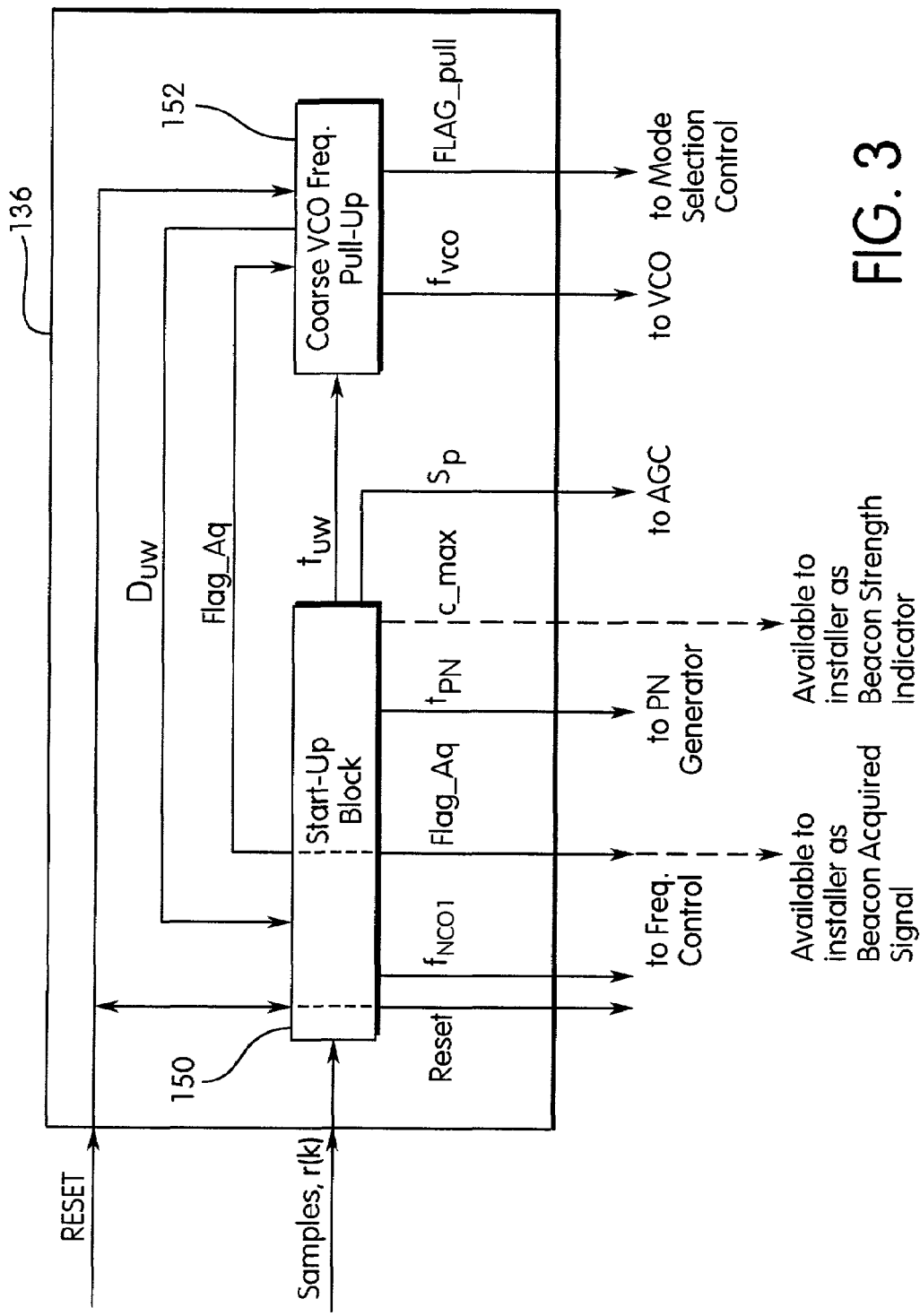
FIG. 3 is a block diagram illustrating further details of an example of the acquisition block of a satellite terminal shown in FIG. 2 in accordance with an embodiment of the present invention.

Acquisition block 136 is shown in greater detail in FIG. 3. In accordance with this embodiment, acquisition block 136 contains start-up block 150 and coarse VCO frequency pull-up block 152. Samples of the input signal are received and processed by start-up block 150. A reset signal is also received by start-up block 150 and coarse VCO pull-up block 152. Start-up block 150 provides a flag acquisition control signal, Flag_Aq, to coarse VCO pull-up block 152. A unique word delta signal ($D_{UW}$) is provided by the coarse VCO frequency pull-up block 152 to the start-up block 150. The acquisition block 136 has a number of output signals including a reset signal, an NCO frequency offset signal ($f_{NCO1}$) which is provided to the frequency control block 148, an acquisition flag (Flag_Aq) which is also, as shown, available to an installer as a beacon acquired signal (BAS), a PN timing signal ($t_{PN}$) which is provided to the PN generator block 146, a c_max value which is available to the installer as a beacon strength indicator (BSI), a signal power value ($S_P$) which is provided to the AGC block 116, a VCO frequency offset signal ($f_{vco}$) which is provided to the VCO, and finally a pull-up flag (Flag_pull) which is provided to the mode selection control block 140.

Figure 4:
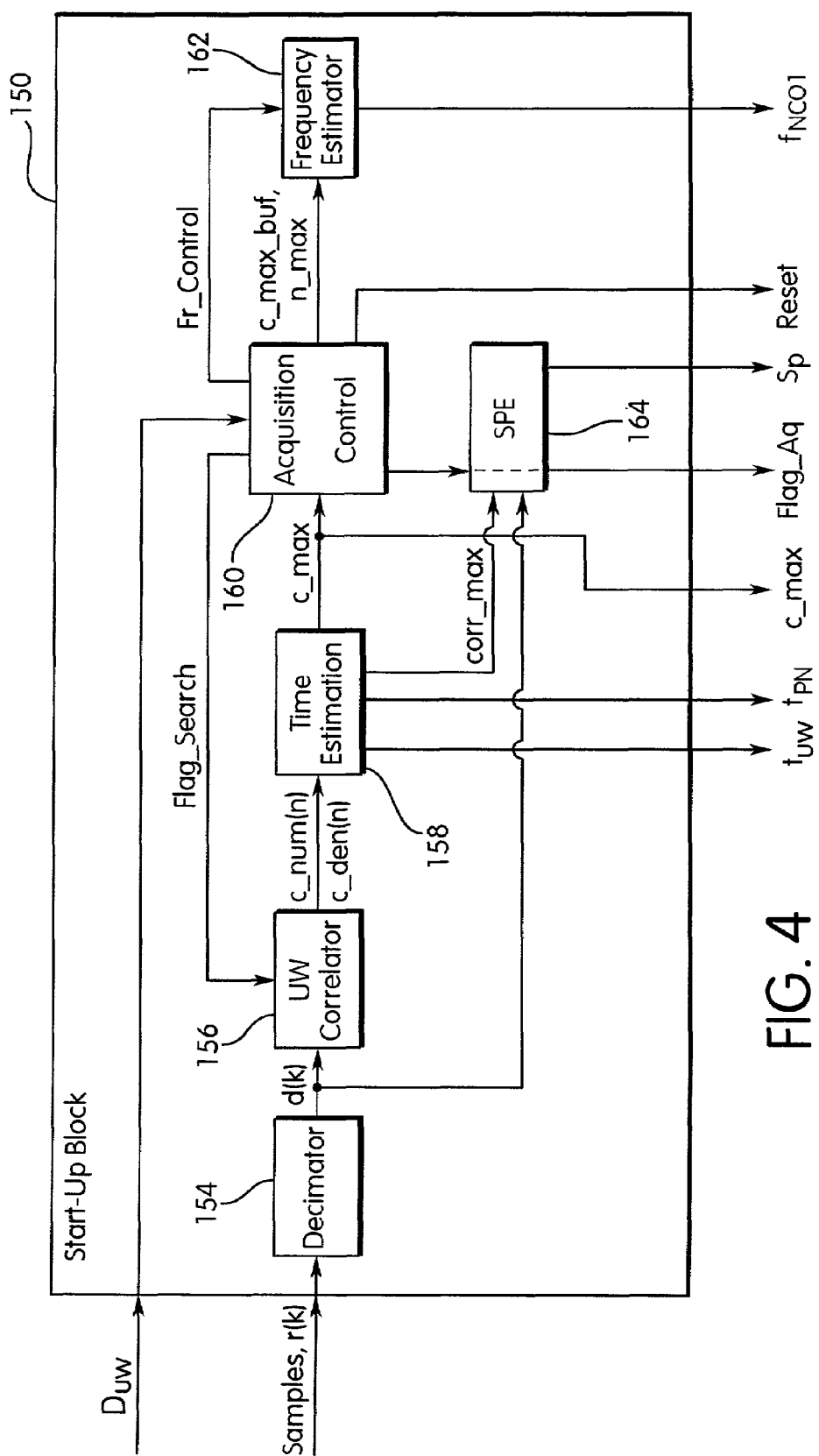
FIG. 4 is a block diagram illustrating further details of an example of the start-up block within the acquisition block shown in FIG. 3 in accordance with an embodiment of the present invention.

Start-up block 150 is shown in further detail in FIG. 4. The start-up block 150 is comprised of a decimator block 154, a unique word correlator block 156, a time estimation block 158, an acquisition control block 160, a frequency estimation block 162 and a signal power estimation block 164. The decimator block 154 receives input samples and provides a decimated sample sequence to unique word correlator block 156 and signal power estimation block 164. The unique correlator block 156 receives the decimated set of samples and correlates them against a known unique word pattern. The unique word correlator block 156 then calculates a series of c_num and c_den values based on the correlation as will be described in more detail below. C_num and c_den are provided to the time estimation block 158.

The time estimation block 158 calculates a unique word timing signal and a PN timing signal based on the received c_num and c_den values. The time estimation block 158 further calculates a c_max value and a corr_max value. C_max is provided to the acquisition control block 160 and as an output of the start-up block 150. The corr_max value is provided to the signal power estimation block 164. The acquisition control block 160 provides a search flag (Flag_

Search) for the unique word correlator block 156. The acquisition control block 160 further provides the acquisition flag (Flag_Aq) both as an output of the start-up block 150 and as an input to the signal power estimation block 164, and further provides a frequency control signal (Fr_Control) as well as c_max_buf and n_max values to the frequency estimation block 162. Also, the acquisition control block 160 generates a reset signal based on the status of the acquisition process. Finally, the frequency estimation block 162 generates NCO frequency offset signals ($f_{Nco1}$) which are provided as an output of the start-up block 150.

Figure 5:
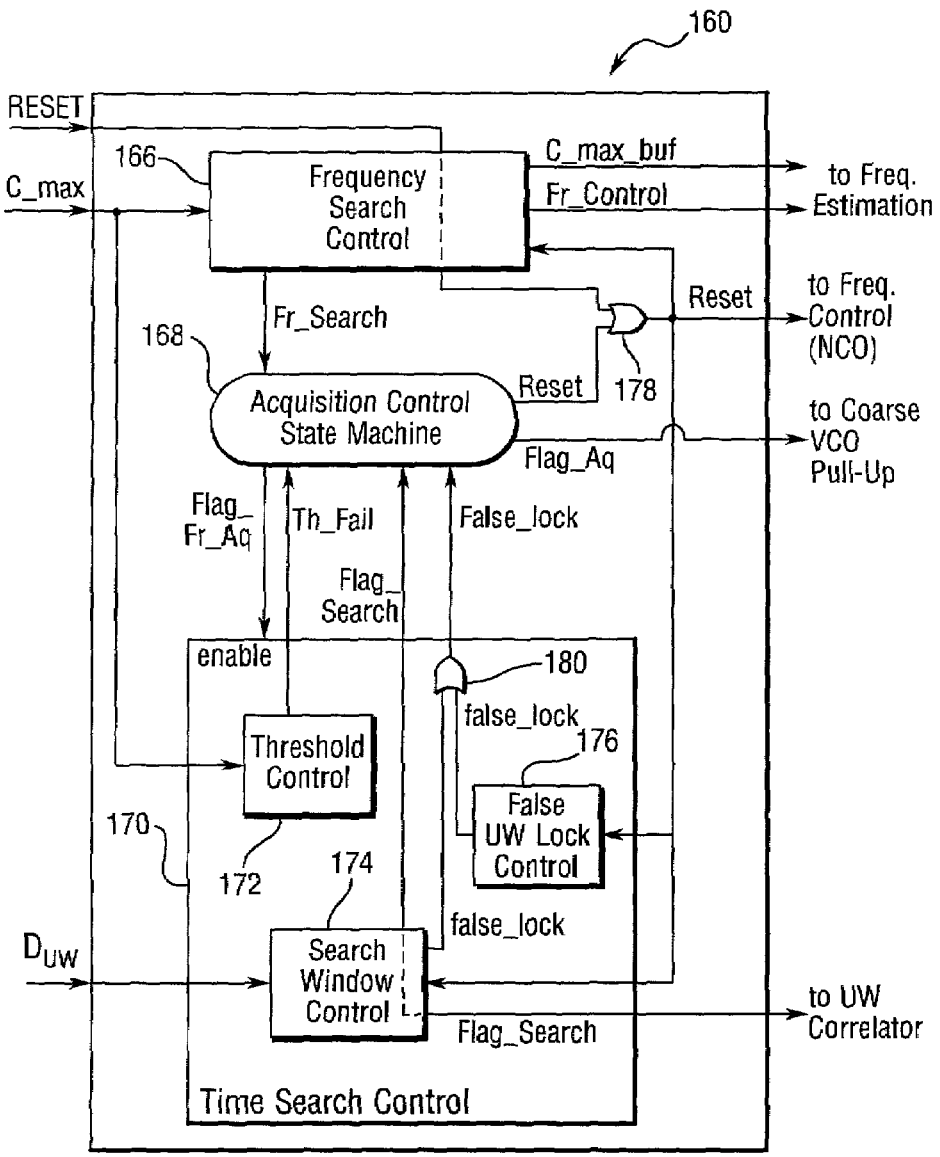
FIG. 5 is a block diagram illustrating further details of an example of the acquisition control block within the start-up block shown in FIG. 4.

Acquisition control block 160 is shown in further detail in FIG. 5. The acquisition control block 160 has a frequency search control block 166, an acquisition control state machine 168 and a time search control block 170. The time search control block 170 is further comprised of a threshold control block 172, a search window control block 174 and false UW lock control block 176. Acquisition control block 160 has three inputs. The reset signal from mode selection control block 142 is received by an OR gate 178. Acquisition control state machine 168 generates a second reset signal which is also received at OR gate 178. The output of OR gate 178 is a reset signal received by the frequency search control block 166, the false UW lock control block 176 and the search window control block 174, as well as being passed on to the frequency control block 148. The c_max value from time estimation block 158 is received by the frequency search control block 166 and the threshold control block 172. The unique word delta value ($D_{UW}$) from coarse VCO pull-up block 152 is received by the search window control block 174. Frequency search control block 166 produces three outputs. The value of c_max_buf and the control signal Fr_Control are delivered to the frequency estimation block 162. Control signal Fr_Search is sent to acquisition control sate machine 168. The functionality of the frequency search control block 166 will be described in greater detail below.

Figure 6:
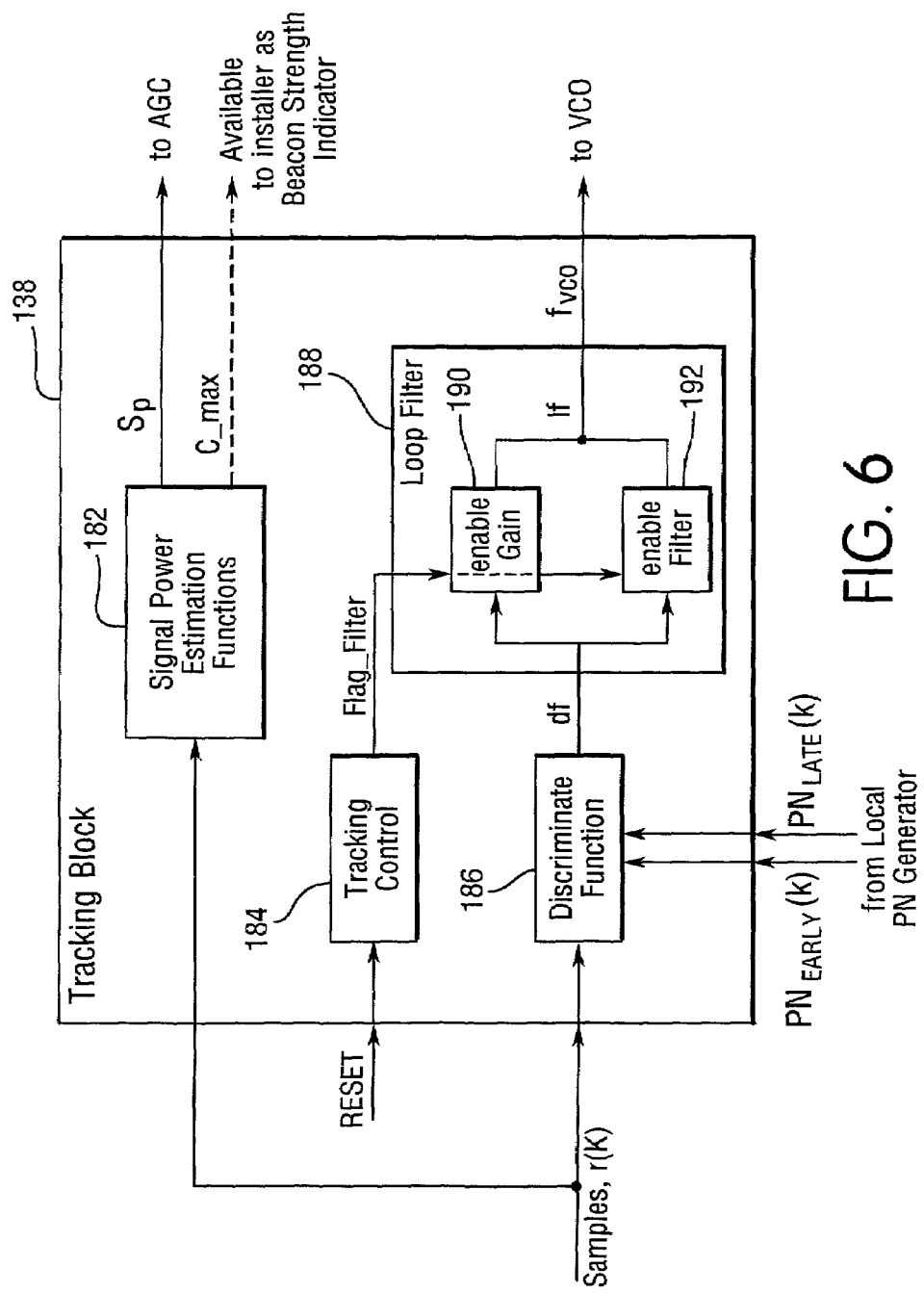
FIG. 6 illustrates further details of an example of the tracking block included in the satellite terminal components shown in FIG. 2.

Acquisition control state machine 168 has four inputs and three outputs. The inputs are Fr_Search from frequency search control block 166 Th_Fail from threshold control block 172, a search flag (Flag_Search) from search window control block 174 and a false lock control signal (false_lock) from OR gate 180. The outputs of acquisition control state machine 168 are a frequency acquisition flag (Flag_Fr_Aq) which is delivered to time search control block 170 and acquisition flag (Flag_Aq) which is delivered to coarse VCO pull-up block 152, a reset signal is also generated and delivered to OR gate 178. The functionality of acquisition control state machine 168 is further described in The following state transition Table 1:

FIG. 6 shows tracking block 138 from FIG. 2 in greater detail. A tracking block 138 comprises a signal power estimation functions block 182, a tracking control block 184, a discriminate function block 186 and a loop filter block 188. The loop filter block 188 is further comprised of simple gain function 190 and third order loop filter function 192. The input samples are received at the signal power estimation functions block 182 and at the discriminate function block 186. The reset signal is received at tracking control block 184. The signal power estimation functions block 182 generates a signal power value ($S_p$), signal which is sent to AGC block 116 and a $c_{13}$max value which is available to the installer as the beacon strength indicator (BSI). In addition to receiving samples, the discriminate function 186 receives early and late versions of the PN sequence from the PN sequence generator 146. The discriminate function compares the incoming samples to both the early and late versions of the PN signal and generates a discriminate function value which is passed either to simple gain block 190 or third order loop filter block 192. The functionality of the discriminate function block 186 will be described in greater detail below. Simple gain block 190 or third order loop filter block 192 are alternatively enabled by a filter flag signal ($Flag_{13}filter$) supplied by tracking control block 184. The output of loop filter block 188 is a VCO frequency offset value ($f_{VCO}$) that is sent to mode switch 142 and from there on to the VCO to adjust the VCO frequency.

Figure 7:
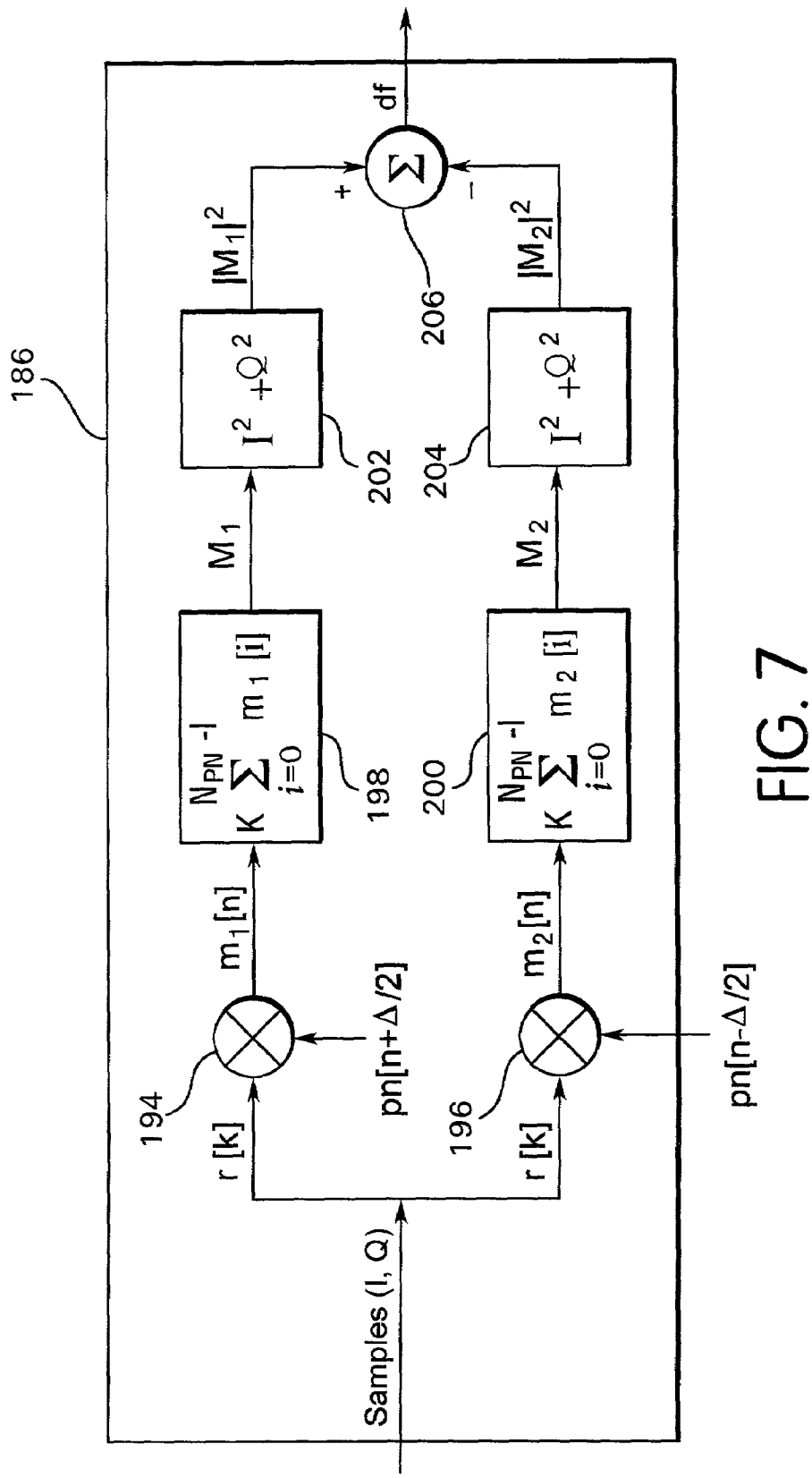
FIG. 7 illustrates further details of an example of the discriminate function block employed in the tracking block shown in FIG. 6.

FIG. 7 shows discriminate function block 186 in greater detail. Input samples are received at discriminate function block 186 and delivered to multipliers 194 and 196. The multipliers 194, 196 receive early and late versions of the PN sequence from PN sequence generator 146 respectively. Multiplier 194 multiplies each sample of the incoming stream by a sample of the late PN sequence and multiplier 196 multiplies each sample of the incoming signal by one sample of the early PN sequence. The resulting multiplied early samples are then summed in summer block 198 while the multiplied samples of the late PN sequence are summed in summer block 200. Early and late summation values are then sent to absolute magnitude function blocks 202 and 204. The absolute function blocks square the I and Q portions of the received signal and produce absolute magnitude values ($|M|^2$). The absolute magnitudes of the early and late correlations are then compared at comparator 206. The output of comparator 206 is a discriminate function value which is provided to the loop filter 188.

A higher order loop filter (at least third order) is used in order to track the frequency of the incoming signal very accurately. Ordinary DLL filters track the phase (varying time delay) of a continuous signal. However, because the frequency of a signal is the derivative of the phase, the

TABLE 1

State Transition Table

| Present State | Inputs | | | | Next State | Outputs | | |
|---|---|---|---|---|---|---|---|---|
| | Fr_Search | False_lock | Flag_search | Th_fail | | Flag_Fr_Aq | Flag_Aq | Reset |
| 0 | 0 | X | X | X | 0 | 0 | 0 | 0 |
| 0 | 1 | X | X | X | 1 | 1 | 0 | 0 |
| 1 | X | 0 | 0 | 0 | 1 | 1 | 0 | 0 |
| 1 | X | 0 | 1 | 0 | 1 | 1 | 1 | 0 |
| 1 | X | X | X | 1 | 0 | 0 | 0 | 1 |
| 1 | X | 1 | X | X | 0 | 0 | 0 | 1 | inventors have discovered that a DLL may be used to track the frequency of a signal as well. The higher order loop is used to track the frequency of the discontinuous synchronization signal very accurately, while a low order loop is initially used to reduce the initial error and thereby avoid unwanted transient effects associated with higher order loops. The inventors have found that the use of a third order loop increases frequency tracking performance by roughly two orders of magnitude over a second order loop.

Figure 8:
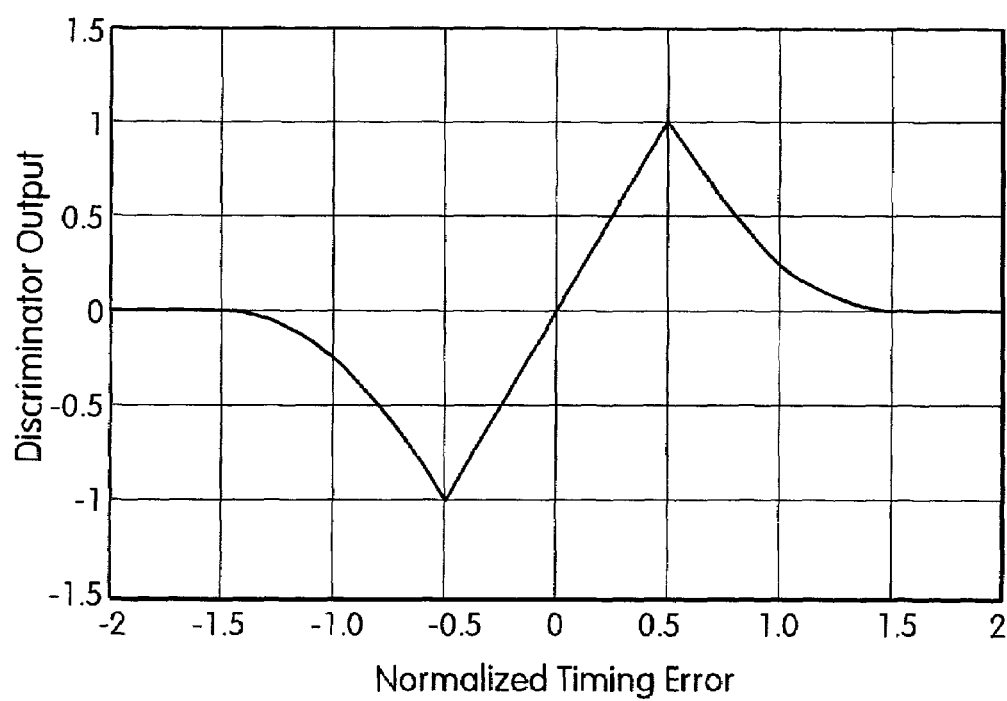
FIG. 8 illustrates an example of the output of the discriminate function block shown in FIG. 7 for different normalized timing errors.

FIG. 8 shows an example of the output of the discriminator function block 186 for different normalized timing errors. Positive values of the discriminator output indicate that the incoming PN sequencing early on negative values indicate that the incoming PN sequence late. As shown, the discriminator output has a linear response between the minimum value at one-half of a symbol late and the maximum value at one half of a symbol early. At ranges between one-and-a-half symbols later and one-and-a-half symbols early, a discriminate output of zero indicates that the incoming PN sequence is exactly on time. This output is in turn used by loop filter 188, to generate a VCO frequency offset ($f_{vco}$) to be used to adjust the VCO frequency.

Figure 9:
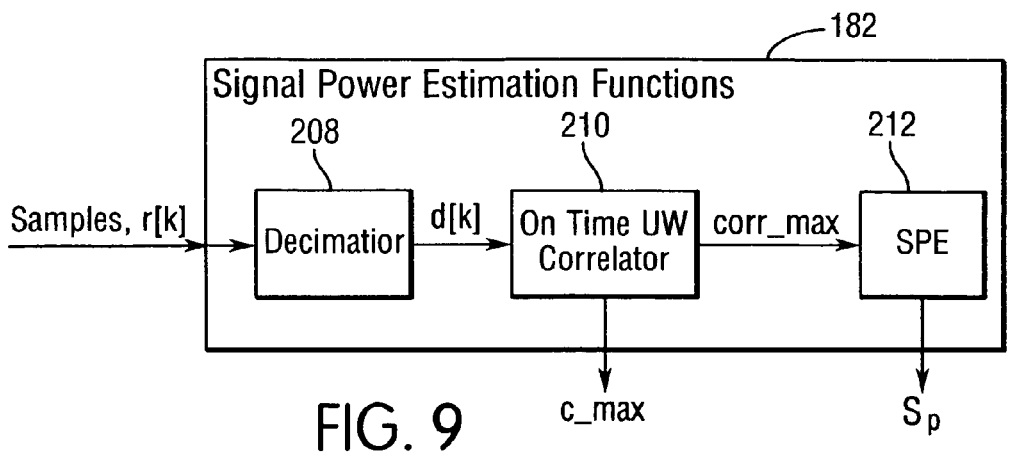
FIG. 9 is a block diagram showing further details of an example of the signal power estimation block of the tracking block shown in FIG. 6.

Signal power estimation functions block 182 is shown in greater detail in FIG. 9. Input samples are received by a decimator block 208. The decimator block decimates the sample sequence and produces a decimated sample sequence (d[k]) which is passed on to the on-time UW correlator block 210. The on-time UW correlator block 210 correlates the decimated sample sequence against the known unique word sequence and produces two values. The first value, c_max, is available to an installer as the beacon strength indicator. The second value, corr_max, is sent to a signal power estimation block 212. The signal power estimation block 212 generates a signal power value ($S_P$) which is sent to the AGC block 116 to determine the gain to be applied to the incoming wave form.

Figure 10:
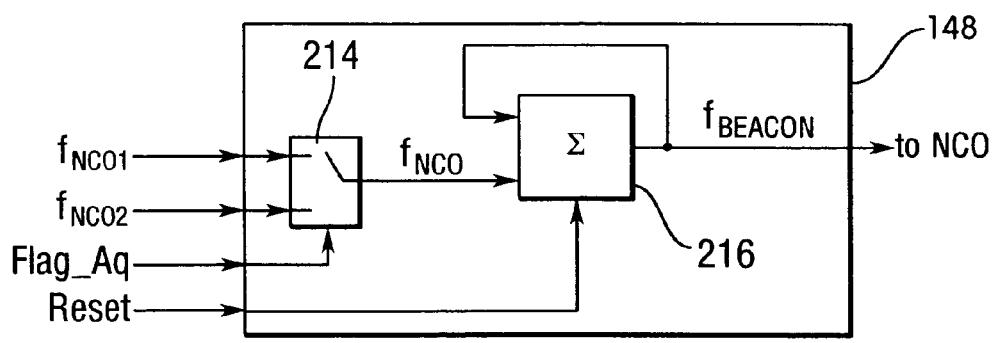
FIG. 10 is a block diagram showing further details of an example of the frequency control block included in the components shown in FIG. 2.

Frequency control block 148 of FIG. 2 is shown in greater detail in FIG. 10. The frequency control block 148 receives two NCO frequency offset signals, $f_{NCO1}$ and $f_{NCO2}$. Frequency offset signal $f_{NCO1}$ is received from the acquisition block 136. Frequency offset signal $f_{NCO2}$ is received from the DRO frequency offset estimator, and lock detector block 134. Both frequency offset signals are received at frequency offset selector block 214 and selected based on the value of the acquisition flag, Flag_Aq. The selected frequency offset value is passed on to a summer block 216. The summer block adds the frequency offset value to the current beacon frequency value ($F_{BEACON}$) to generate a new beacon frequency value. The beacon frequency value is in turn passed on to the NCO to control the frequency of the NCO. The summer block also receives the reset signal which resets the NCO frequency value to zero.

Figure 11:
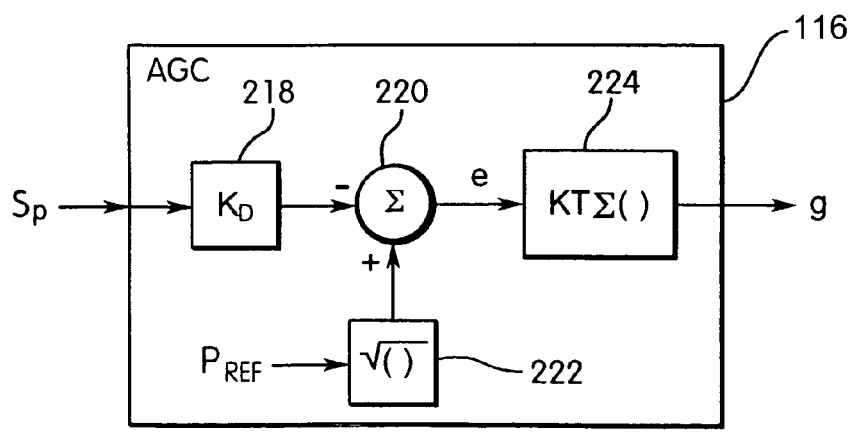
FIG. 11 is a block diagram showing further details of an example of the AGC block included in the components shown in FIG. 2.

The AGC block 116 of FIG. 2 is shown in greater detail in FIG. 11. The signal power value ($S_P$) is received by AGC block 116 and multiplied by the factor $K_d$ in multiplier block 218. The output of multiplier block $K_d$ 218 is sent to a comparator 220. A reference power signal is square-rooted at square-root function block 222 and then compared against the output of multiplier block $K_d$. 218 at comparator 220. A signal representing the difference between the two inputs of the comparator 220 is output to a function block 224. The output of the function block 224 is the value of the gain to be applied to the incoming wave form. This conditions the incoming wave form signal so that the data converter 120 can properly resolve the incoming wave form into digital samples. Without the gain value the wave form inputted to the D/A convertor 120 might be out of the range of the D/A convertor 120 causing the output of the A/D converter to be either saturated or all zeroes.

Figure 12:
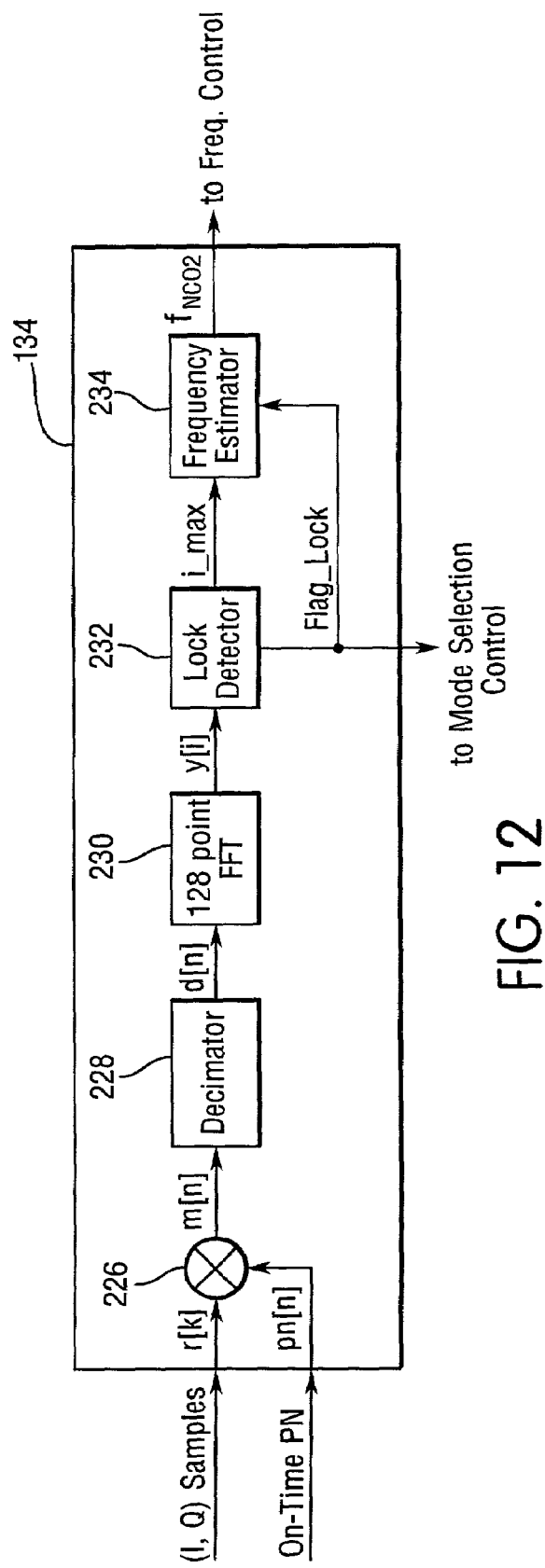
FIG. 12 is a block diagram illustrating further details of an example of the DRO Frequency Offset Estimator and Lock Detector block included in the components shown in FIG. 2.

The DRO frequency offset estimator and lock detector 134 of FIG. 2 is shown in greater detail in FIG. 12. In the DRO frequency offset estimator and lock detector 134 the received input samples are multiplied at multiplier 226 with samples representing an on-time PN sequence received from PN sequence generator 146. A series of samples representing the product of the on-time PN sequence with the received samples is output from multiplier 226 and sent to decimator 228. The decimator 228 decimates the number of samples in the received product sequence and outputs a decimated sequence (d[n]) to a 128 point FFT block 230. The output of the 128 FFT block 130 is 128 indexed values (y[i]) representing the magnitudes of 128 frequency components generated from the decimated input samples. The 128 frequency component magnitude values are generated in each of the 128 frequency bins of the 128 FFT block 230.

The lock detector 232 receives the 128 frequency component magnitude values and generates a lock flag (flag$_{13}$ lock) and a maximum index value, $i_{13}$ max. The maximum index is the index number of the maximum value frequency component from FFT block 230. The lock flag indicates whether or not the incoming signal is locked with the on-time PN signal. The lock flag is then sent to both a frequency estimator 234 and mode selection control block 140. The value $i_{13}$ max is also sent to the frequency estimator 234. The frequency estimator block 234 receives the maximum index value, $i_{13}$ max and the lock flag and determines an NCO frequency offset value to be sent to the frequency control block 148. The NCO frequency offset value, $f_{NCO2}$ will be used to adjust the frequency of the NCO in the NCO and control logic block 128.

Downlink Signal

Figure 13:
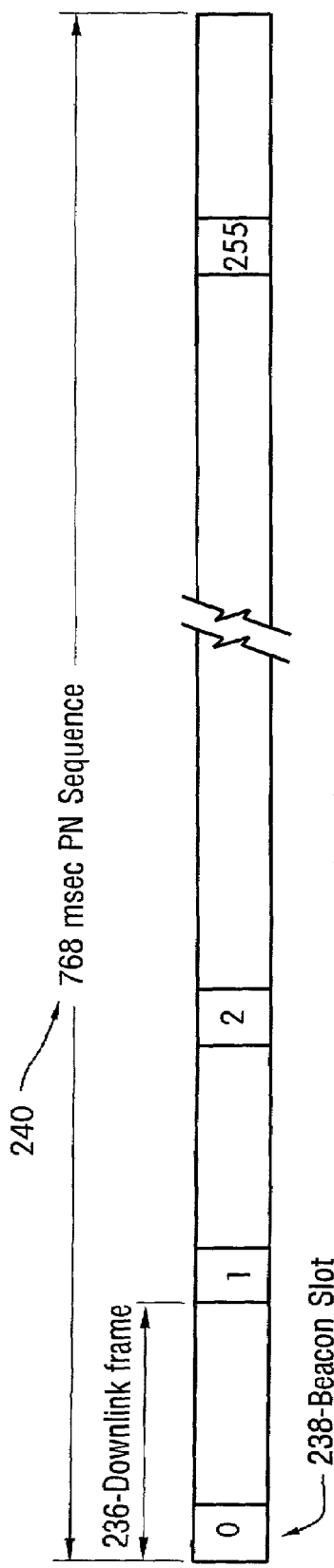
FIG. 13 illustrates an example of one superframe of the downlink signal received by a satellite terminal in the system shown in FIG. 1.

The features of the downlink signal 104 that is received by the beacon demodulator 112 will now be described in detail. The downlink signal 104 is unique in that the beacon information and the data are both incorporated into the same carrier signal. An example of the format of the downlink signal 104 is illustrated in FIG. 13. The downlink signal is transmitted as a series of 3 msec downlink frames 236. The downlink frames are divided into time division multiplexed (TDM) time slots. The first time slot in each frame is a TDM beacon slot 238. The beacon slot 238 in each frame contains both a unique word sequence and a portion of the PN sequence. A series of 256 downlink frames forms a 768 msec superframe 240. Of course those skilled in the art will recognize that the beacon slot may be provided in periodic frames, rather than every frame, and the above description may be modified to reflect such a situation.

Figure 14:
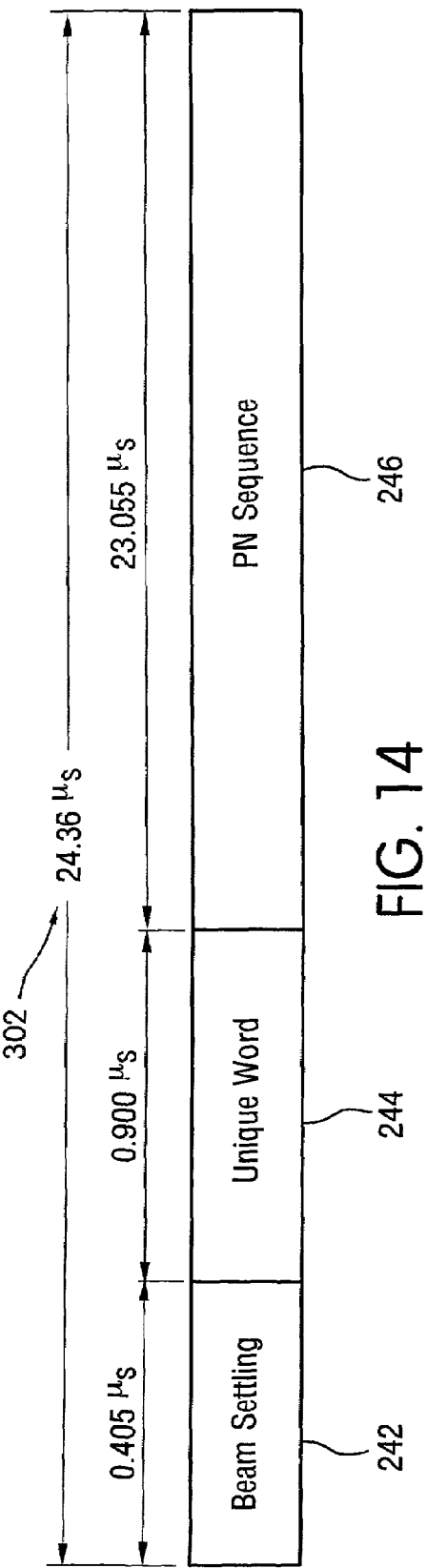
FIG. 14 illustrates an example of the beacon portion of the downlink signal.

FIG. 14 shows the beacon slot 238 in greater detail. Each beacon slot is comprised of a beam settling period 242, the unique word sequence 244 and a portion of the PN sequence 246. The unique word sequence is the same in each frame, and helps the beacon demodulator 112 recognize that the correct carrier is being acquired and tracked. The PN sequence consists of a plurality of unique PN codes. A typical PN sequence may consist of 256 unique PN codes. One PN code is inserted into the beacon slot of each frame, such that the PN sequence 246 is unique in each frame 236 of a particular superframe 240. The series of PN sequences 246 repeats in each superframe such that the PN sequence identifies the position of each frame within the superframe.

Thus, the PN sequence represents the phase of the incoming downlink signal with respect to the superframe, and repeats every 768 msec.

Figure 15:
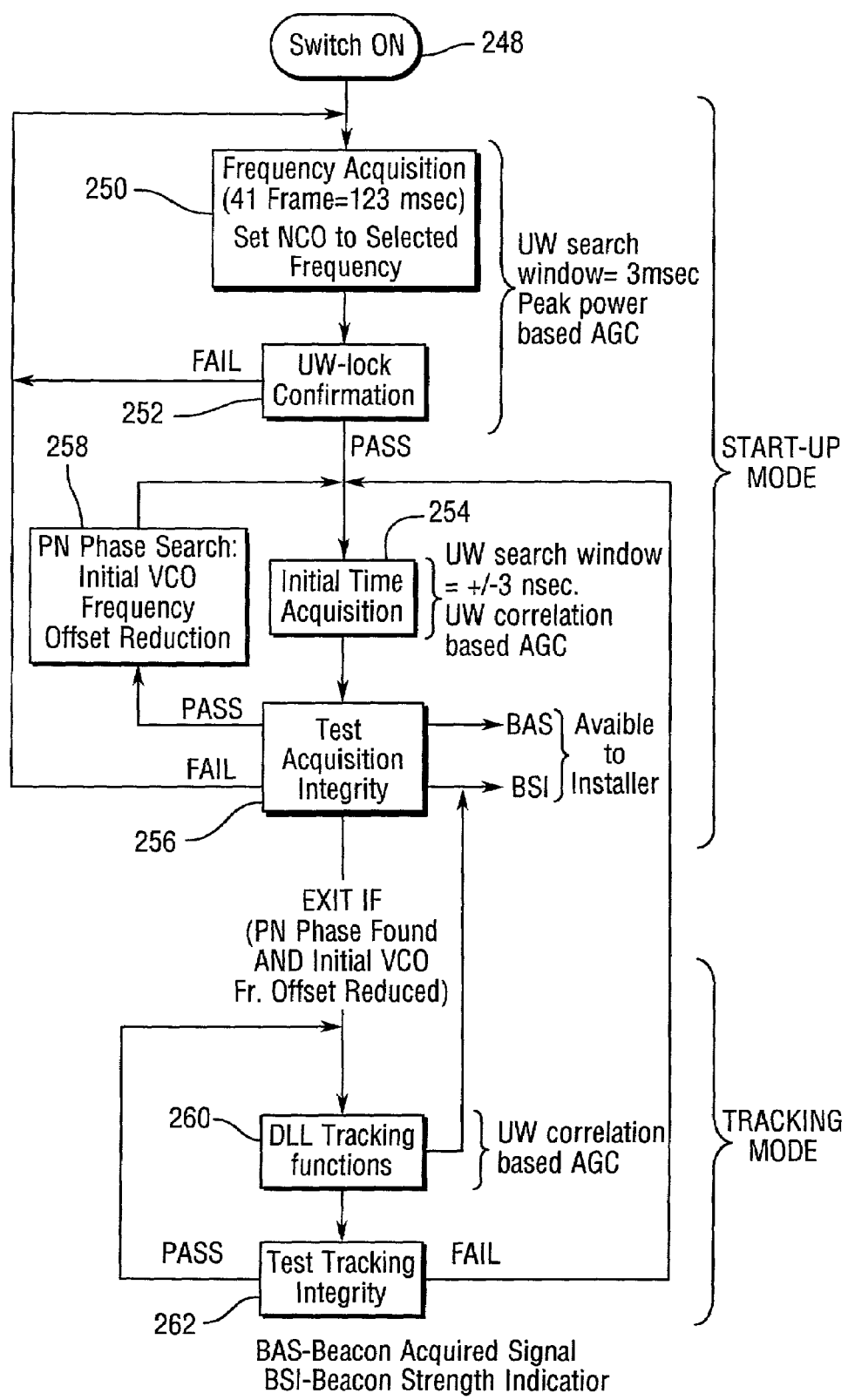
FIG. 15 is a flowchart illustrating an example of the operations performed by the components shown in FIG. 2 for demodulation, and signal acquisition and tracking of a beacon signal in accordance with an embodiment of the present invention.

FIG. 15 is a flowchart depicting an example of the overall program flow of the beacon demodulator 112. As shown, the two major portions of program flow are the start-up mode and the tracking mode. When the beacon demodulator 112 is first switched on at step 248, the beacon demodulator 112 lacks references to both the timing and frequency of the incoming downlink signal. At this point the DRO frequency has an uncertainty range of +/−4 MHz. Each 3 msec downlink frame is tested at a different frequency to cover the entire +/−4 MHz uncertainty range at step 250. Within each 3 msec window the beacon demodulator 112 tests for the presence of the unique word sequence. The frequencies are tested in 200 kHz increments. Thus, the entire +/−4 MHz uncertainty range is covered in 41 frames, or 123 msec. At the end of the frequency acquisition step 250 the NCO is set to the frequency at which the highest unique word correlation value was generated. The unique word lock confirmation step 252 confirms that the same unique word is found in successive frames. If the unique word confirmation step 252 fails, the frequency acquisition step 250 is repeated.

During the initial frequency acquisition and unique word lock confirmation steps, the entire 3 msec of each downlink frame is tested for the presence of the unique word. Also, during this period the gain of the AGC 116 is determined based on the peak power received during any ½ time slot interval during each frame. If the unique word lock confirmation step 252 passes, acquisition continues with the initial time acquisition step 254. After the initial time acquisition 254, the acquisition integrity is tested at step 256. If the acquisition integrity test passes, the system begins a PN phase search and an initial VCO frequency offset reduction at step 258. If at any time the acquisition integrity fails, the frequency acquisition step 250 must be repeated. Otherwise, the system continues to search for the PN phase and to reduce the initial VCO frequency offset.

Once the PN phase is found and the initial VCO frequency offset has been reduced below a certain threshold, acquisition is complete and the system moves to tracking mode. During the PN phase search and the initial VCO frequency offset reduction the unique word search window is reduced from the full 3 msec to a +/−30 nsec window. Also, the gain of the AGC 116 is determined by unique word correlation value. During the tracking mode, the beacon demodulator performs DLL tracking functions 260 and continues to tests the tracking integrity at step 262. The system continues this loop until the tracking integrity test fails. If the tracking integrity test fails, the system goes back to the acquisition integrity test and if the acquisition integrity test fails, the system goes back to the frequency acquisition test 250.

Figure 16:
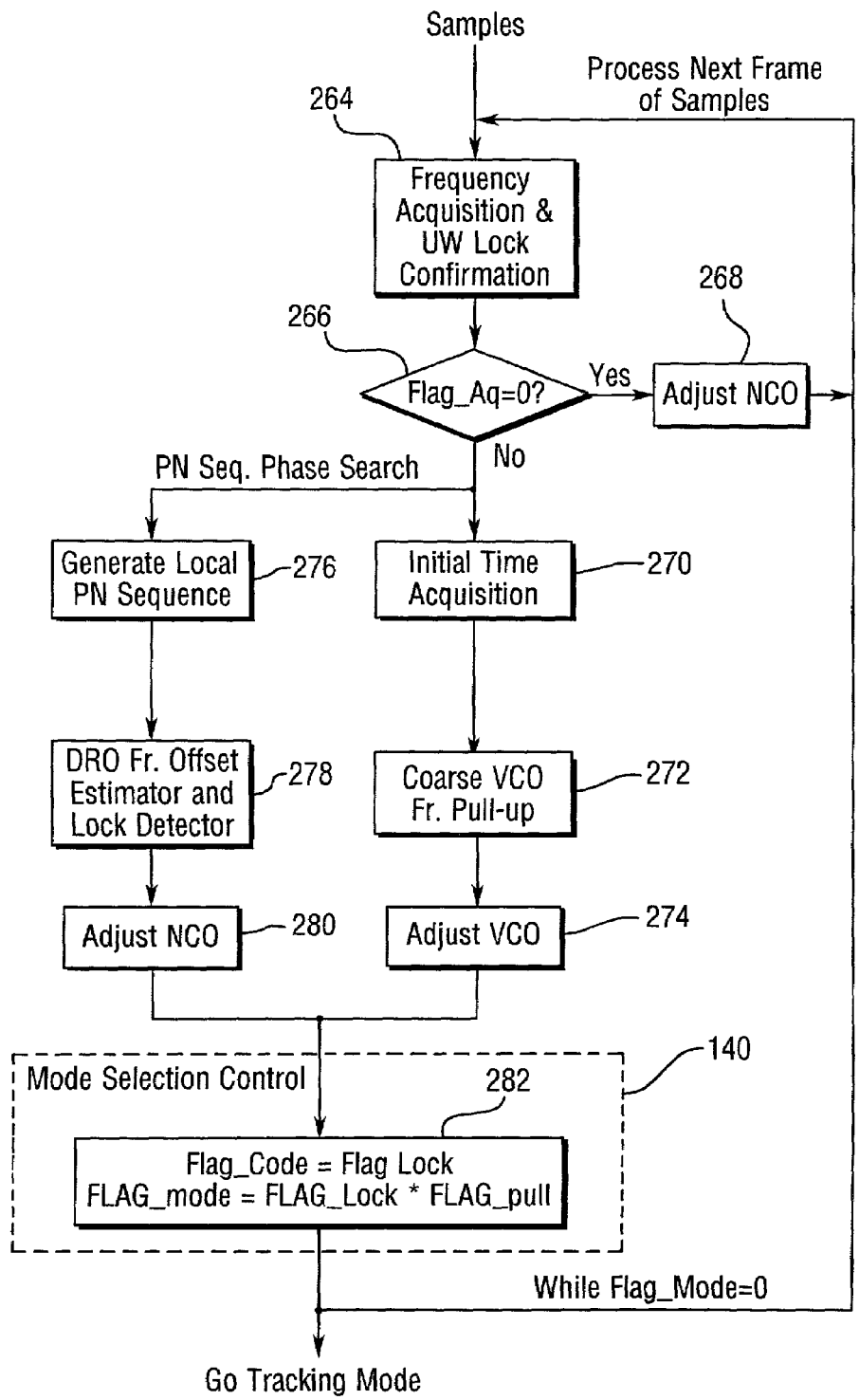
FIG. 16 is a flowchart illustrating an example of operations performed by the components shown in FIG. 2 during an acquisition mode.

The steps performed during acquisition mode are described more fully in FIG. 16. The first step is frequency acquisition and UW lock confirmation 264. During this step, an acquisition flag, $flag_{13}aq$, is set once the frequency and unique word lock confirmation has been completed. This process is described in more detail below. The acquisition flag is tested at step 266, and if it has not been set, then the frequency of the NCO is adjusted at step 268 and the frequency acquisition and unique lock confirmation step 264 continues. If the acquisition flag has been set, however, the beacon demodulator 112 begins two parallel processes. The first process consists of an initial timing acquisition step 270, a coarse VCO frequency pull-up step 272 and an adjust VCO step 274. The second parallel process consists of a generate local PN sequence step 276, a DRO frequency offset estimator and lock detector step 278 and an adjust NCO frequency step 280. During the two parallel processes, a pull-up flag, flag pull and a lock detection flag, $flag_{13}lock$, are either set or not set depending on whether the VCO frequency has been pulled up to within tolerance and whether the system has locked onto the PN sequence. The mode selection control block 142 tests the lock detection flag and the pull-up flag at step 282. Once both flags have been set, the system moves to the tracking mode. If either the lock detection flag or the pull-up flag are not set then the system continues in the acquisition mode.

The frequency acquisition and unique word lock confirmation step 264 discussed above is shown in greater detail in FIG. 17. The first task within step 264 is to perform the frequency acquisition functions 284. The frequency acquisition functions will be described in greater detail below. The system then tests whether the frequency search is complete at step 286. If the search is complete, the frequency acquisition flag (flag_fr_aq) is set to the value 1 at step 288. If the frequency search is not complete, then the frequency acquisition flag is set to zero at step 290. Next the acquisition flag (flag_aq) is set to zero at step 292 and finally the reset signal is set to zero at step 294.

In parallel with the frequency acquisition functions 284, the frequency acquisition flag is tested at step 296. If the frequency acquisition flag has been set, then the time acquisition functions are performed at step 298. The time acquisition functions will be described in greater detail below. If the frequency acquisition flag has not been set, the program flow continues to step 292. After the time acquisition functions 298, the system tests whether a reset is needed at step 300. If a reset is needed, then step 302 is performed in which the frequency acquisition flag (flag_fr_aq) and the acquisition flag (flag_aq) are set to zero and the reset signal is set to one. If a reset was not needed at step 300, then the system tests for UW lock at step 302. If the UW lock test passes, then the acquisition flag (flag_aq) is set to one at step 306 and then the reset signal is set to zero at step 294. If however, the UW lock test fails, then program flow continues to step 292 in which the acquisition flag (flag_aq) is set to zero, then the reset signal is set to zero before continuing.

Figure 17:
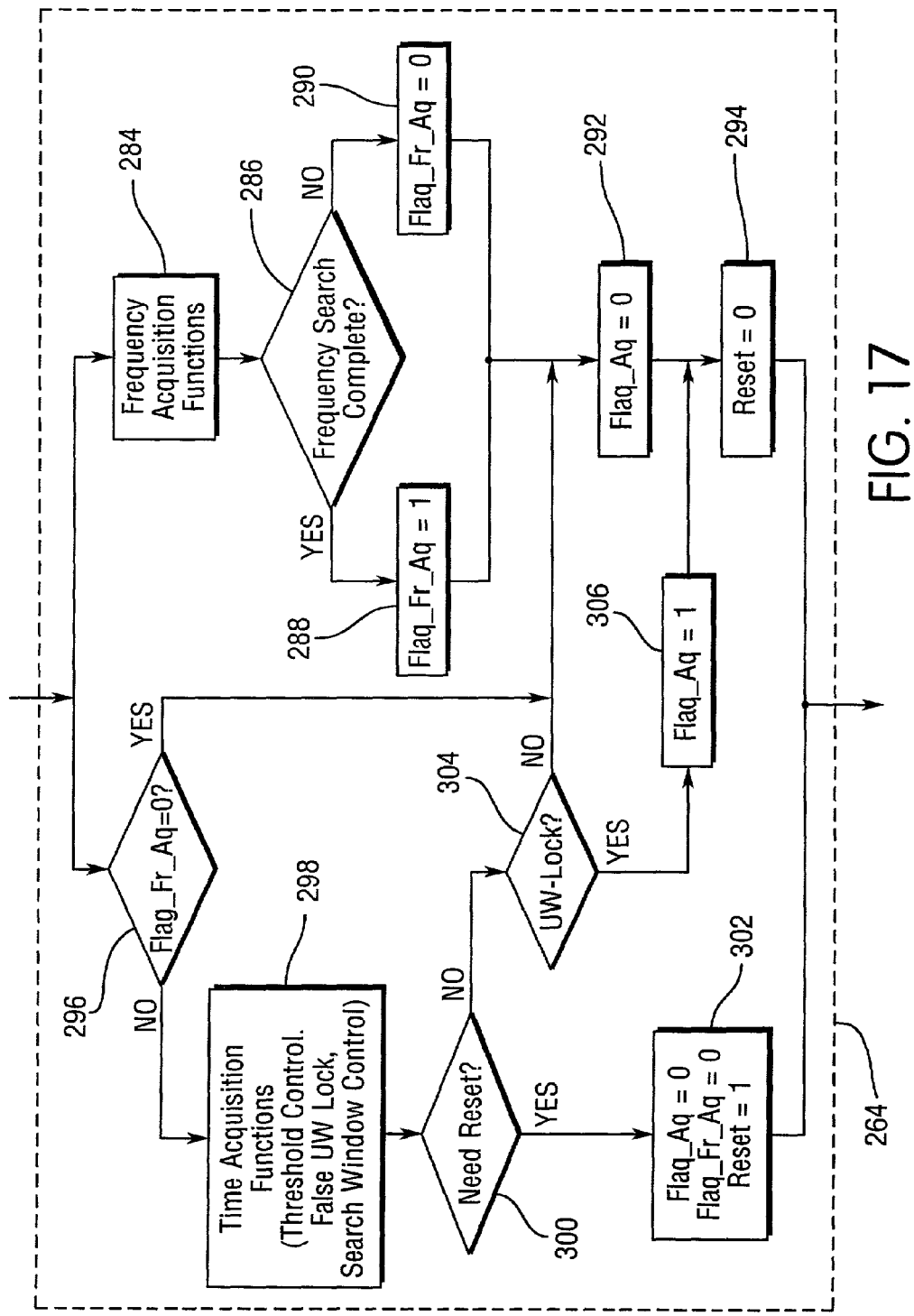
FIG. 17 is a flowchart illustrating in greater detail, an example of the frequency acquisition and UW lock confirmation steps of the flowchart shown in FIG. 16.
Figure 18:
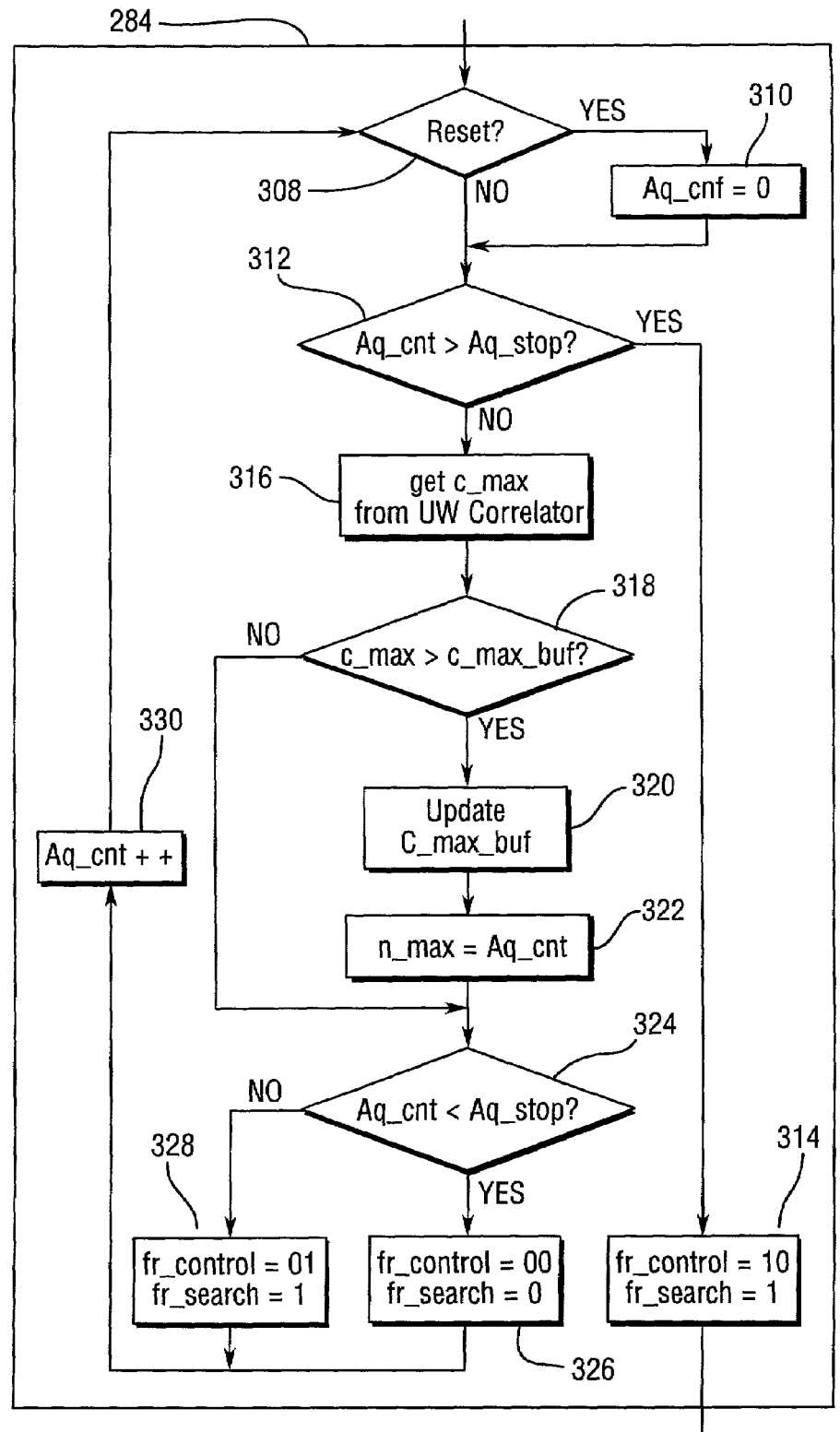
FIG. 18 is a flowchart illustrating in greater detail an example of the frequency acquisition operations in the flowchart of FIG. 17.

Now the frequency acquisition functions identified in step 284 of FIG. 17 will be described in greater detail as shown in FIG. 18. The frequency acquisition functions 284 are performed in the frequency search control block 166. First, at step 308 the reset signal is tested. If the reset signal has been set then local variable acquisition count (aq_cnt) is set to zero at step 310. If the reset signal has not been set, then the acquisition count local variable is not set to zero. Either way, the next step 312 is to test whether the acquisition count variable is greater than an acquisition stop local variable (aq_stop). If acquisition count is greater than acquisition stop, then program flow continues to step 314 in which the two bit frequency control parameter (Fr_control) is set to 10 and the frequency search parameter (Fr_search) is set to 1 before continuing. If the acquisition count is not greater than the acquisition stop value, then the next value of c_max is received from the time estimation block 158 at step 316. At step 318 the value of c_max is tested to see if it is greater of the value of c_max_buf. If c_max is greater than c_max_buf, then at step 320 the value of c_max_buf is updated to be equal to the current value of c_max. Thus, c_max_buf always holds the greatest value of c_max that has been received. Next, at step 322 the variable n_max is made equal to the value the acquisition count variable (aq_cnt). If c_max was not greater than c_max_buf, then steps 320 and 322 are skipped.

At step 324 the acquisition count variable (aq_cnt) is tested to see if it is less than the value of the acquisition stop variable (aq_stop). If acquisition count is less than acquisition stop, then in step 326 the frequency control parameter (Fr_control) is set to 00 and the frequency search parameter is set to 0. If, however, at step 324 acquisition count is not less than acquisition stop (acquisition count is equal to acquisition stop), then at step 328 the frequency control parameter is set equal to 01 and the frequency search parameter is set equal to 1. In either case, after step 326 or 328 the acquisition count variable is incremented at step 330. After acquisition count is incremented, program flow loops back to step 308.

The variable acquisition stop is set equal to the number of frequencies to be tested. As described earlier, in the preferred embodiment 41 frequencies are tested to cover the DRO frequency uncertainty range of +/−4 MHz in 200 kHz increments. Since the variable c_max is the greatest correlation value at each frequency, the variable c_max_buf holds a global maximum correlation value representing the highest correlation out of all the frequencies tested. N_max then will be equal to an index to the frequency at which the greatest correlation value occurred. The parameter frequency search (Fr_search), is used as an input to the acquisition control state machine 168. Frequency control (Fr_control), is a two bit parameter used by the frequency estimation block 162. The frequency estimation block 162 in turn uses the frequency control parameter to determine the value of the NCO frequency offset, $f_{NCO1}$. The following Table 2 shows how the frequency control parameter is interpreted by the frequency estimation block 162.

TABLE 2

Frequency Control Parameter Interpretation.

| Fr_Control | Interpretation |
|---|---|
| 00 | Set frequency adjustment $f_{NCO1}$ = Fr_step (constant) |
| 01 | Set frequency adjustment $f_{NCO1}$ = Fr_est (needs to be estimated) |
| 10 | Set frequency adjustment $f_{NCO1}$ = 0 |
| 11 | Not used |

The timing acquisition functions of step 298 are performed within the time search control block 170 shown in FIG. 5. As described above, the three functional blocks within the time search control block 170 are the threshold control block 172, the search window control block 174, and the false UW lock control block 176. The processes performed by each of these blocks will now be described.

Figure 19:
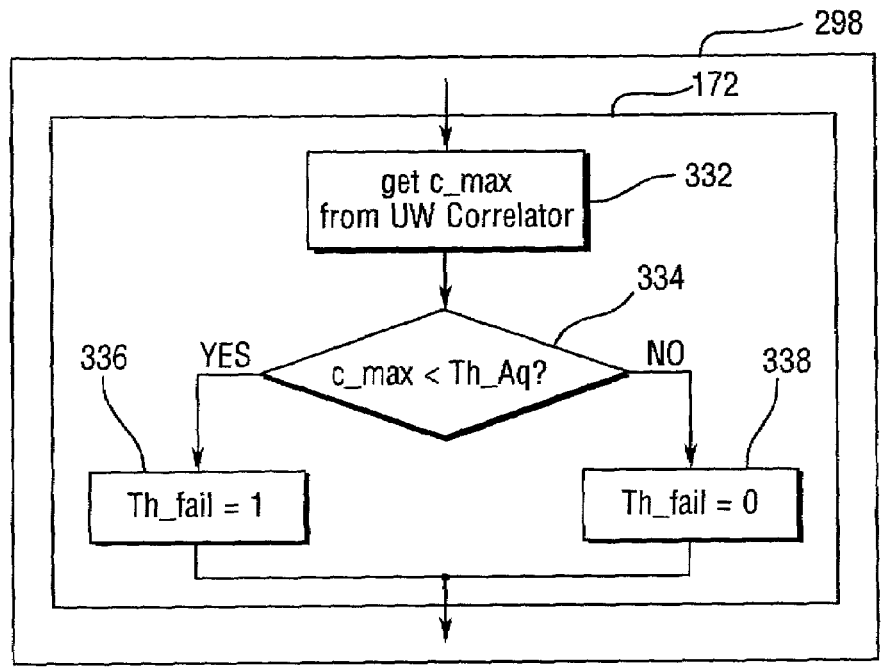
FIG. 19 is a flowchart illustrating an example of operations performed by the threshold control block shown in FIG. 5.

The process performed within the threshold control block 172 is shown in FIG. 19. At step 332, the threshold control block 172 receives the value of c_max from the time estimation block 158. Next, at step 334, the value of c_max is compared against an acquisition threshold value ($Th_{aq}$) and if c_max is less than the acquisition threshold than at step 336 the threshold fail control signal (Th_fail) is set equal to one. If c_max is greater than the acquisition threshold, then the threshold fail control signal set equal to 0 at step 338. The threshold fail control signal is used by the acquisition control state machine 168.

Figure 20:
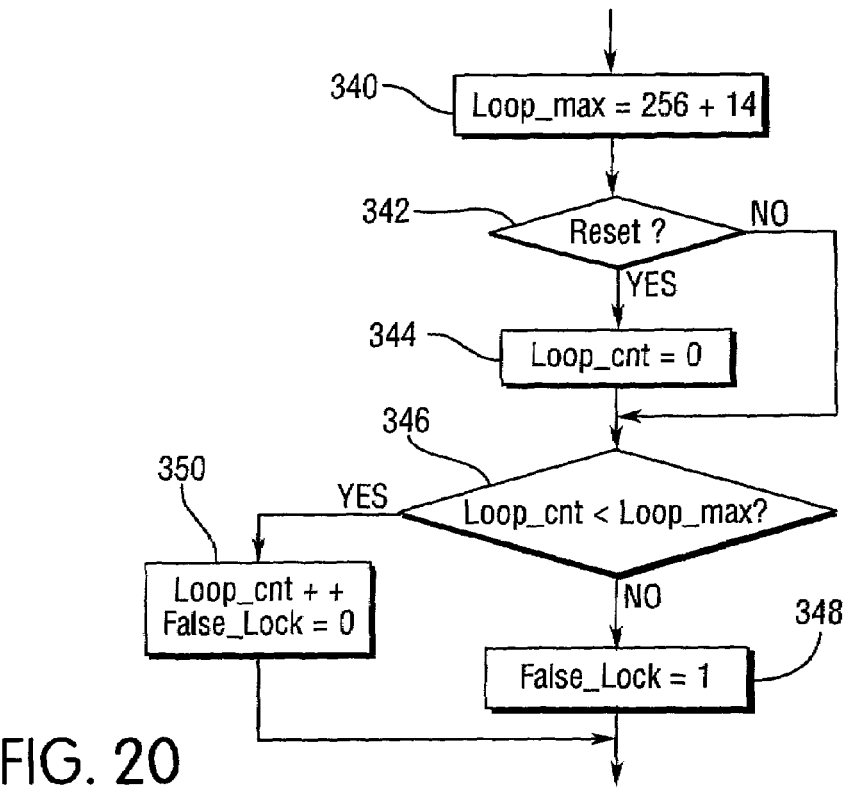
FIG. 20 is a flowchart illustrating an example of the operations performed by the false UW lock control block shown in FIG. 5.

FIG. 20 illustrates the functionality of the false UW lock control block 176. This block protects against the system locking onto the wrong unique word. A local variable (loop_max) is set equal to a maximum number of PN code phases to be tested before a failure is detected. In this case it is equal to 270, the number of PN phase codes per superframe (256) plus 14 extra. Loop_max is set equal to 270 at step 340. At step 342, the reset signal is tested. If a reset is detected, then the variable loop_count is reset to 0 at step 344. Next, at step 346, loop_count is compared to the variable loop_max and if loop_count exceeds loop_max then the false lock control signal (false_lock) is set equal to one at step 348. If however, loop_count remains less then loop_max, then false_lock is set equal to 0 and the loop_count variable is incremented at step 350. Under ordinary circumstances, loop_count should never exceed loop_max because the PN phase will be found within 256 downlink frames.

Figure 21:
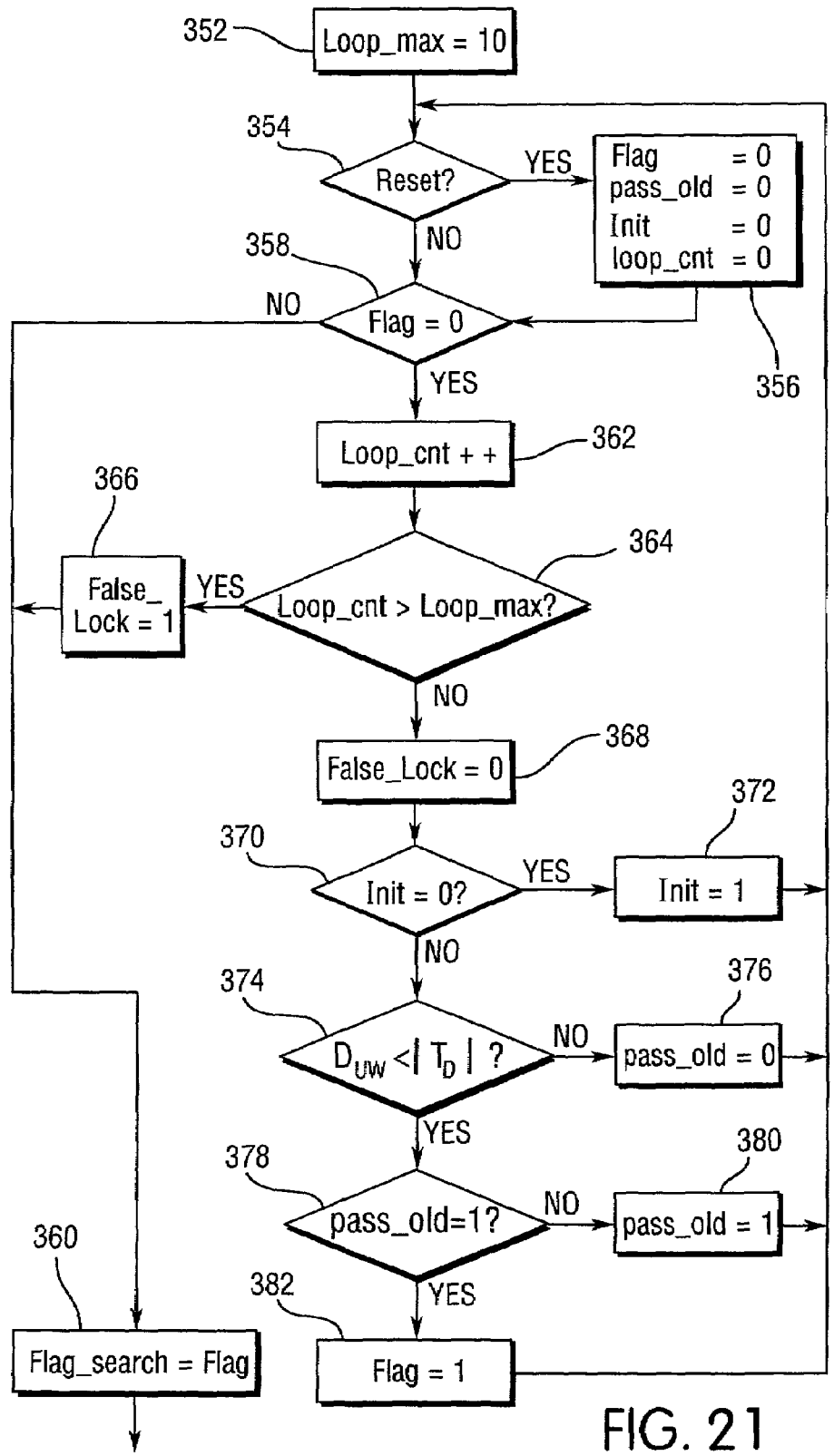
FIG. 21 is a flowchart illustrating an example of the operations performed by the search window control block shown in FIG. 5.

The functionality of the search window control block 174 is described further in FIG. 21. At step 352, a local variable (loop_max) is set equal to 10. At step 354 the reset signal is tested. If the reset signal is set, then at step 356, the variables flag, pass_old, init and loop_cnt are all set to 0. Next, at step 358 the variable flag is tested. If flag is equal to one, then at step 360 the search flag (flag_search) is also set to one and program flow continues. If however, flag is equal to zero at step 258, then at step 362 the variable loop_cnt is incremented and then at step 364 the variable loop_cnt is compared to loop_max. If loop_cnt is greater than loop_max then the variable false_lock is set equal to one at step 366, and at step 360 flag_search will be set equal to zero. If however, at step 364 loop_cnt is not greater than loom_max then program flow continues to step 368, in which the variable false_lock is set equal to zero.

Next, at step 370 the variable init is tested. If init is equal to 0, then at step 372 init is set equal to one, after which program flow loops back to step 354. If however, init was not equal to zero, then program flow continues down to step 374. At step 374 the incoming unique word delta ($D_{UW}$), received from the course VCO frequency pull-up block 152 is tested against a delta threshold ($T_D$). If the absolute value of the unique word delta is not less then the delta threshold, then program flow continues to step 376 in which variable pass old is set equal to zero and then program flow continues up to step 354. If however, in step 374 the unique word delta was less than the delta threshold, then program flow continues down to step 378 in which the variable pass old is tested. If the variable pass_old is not equal to one, then program flow continues to step 380 in which pass_old is set to one and then program flow loops back to step 354. If however, pass_old was equal to one in step 378, then program flow continues down to step 382 in which the variable flag is set to one, then program flow loops back up to step 354. This portion of the program flow essentially determines when the beacon demodulator has successfully lowered the frequency offset so that the unique word is received within an acceptable window in two successive frames. In order for the flag to be set equal one, the unique word delta less than delta threshold has to be received in successive frames. The variable false_lock is used by the acquisition control state machine 168 and the variable flag_search is passed back to the UW correlator 156.

Figure 22:
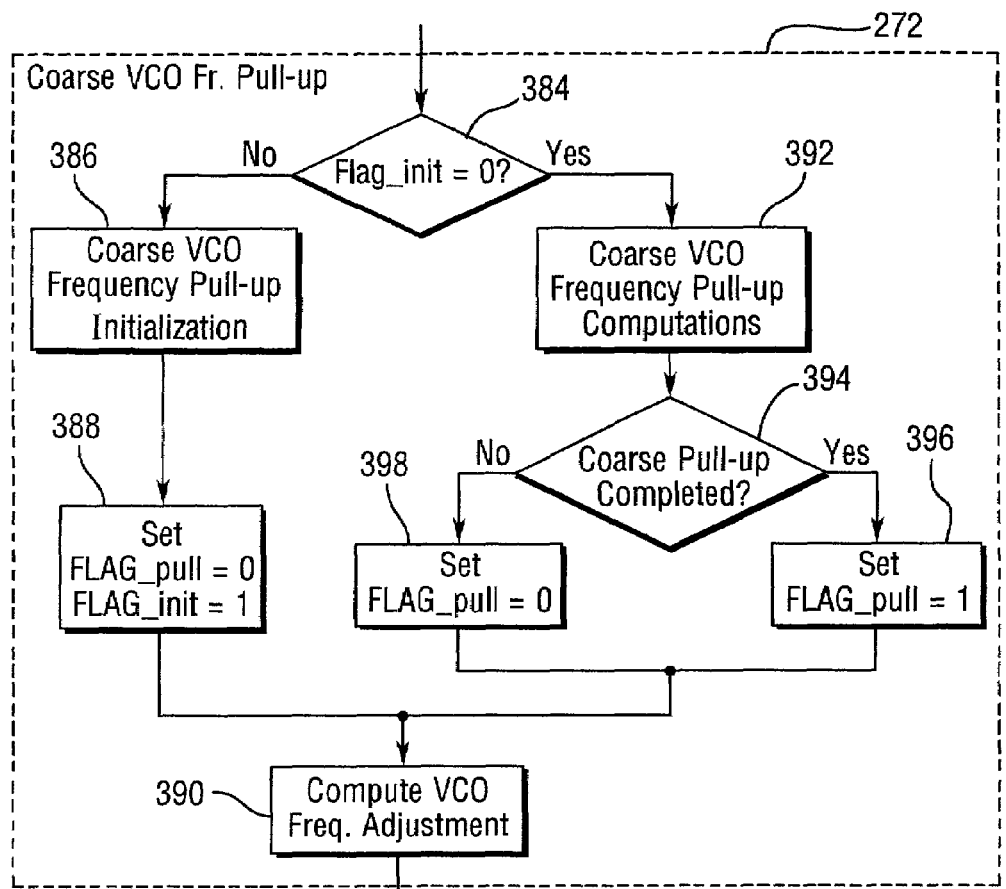
FIG. 22 is a flowchart illustrating in further detail an example of operations performed by the coarse VCO frequency pull-up step of the flowchart in FIG. 16.

Coarse VCO Frequency Pull-up step 272 of FIG. 16 is shown in greater detail in FIG. 22. The first step 384 is to test the status of a local flag (Flag_init) that is set once the coarse VCO frequency pull-up procedure has been initialized. If Flag_init is equal to zero, than the pull-up procedure has not been initialized, and the process continues at step 386, coarse VCO frequency pull-up initialization. Next, at step 388, the pull-up flag (FLAG_pull) is set to zero, indicating that the pull-up procedure is not complete. Also at step 388, Flag_init is set to 1, indicating that the coarse VCO frequency pull-up initialization procedure has been completed (Flag_init is set to zero whenever a reset signal is received). Next, the VCO frequency adjustment is computed in step 390.

If the initialization flag (Flag_init) is set to 1 when coarse VCO frequency pull-up step 272 is begun, program flow continues with step 392, the coarse VCO frequency pull-up computations. Step 394 determines if the coarse VCO pull-up is completed. If it is complete, than FLAG_pull is set to 1 at step 396. If coarse VCO pull-up is not completed, than FLAG_pull is set to zero at step 398. Either way, program flow continues with the computation of the VCO frequency adjustment 390.

Figure 23:
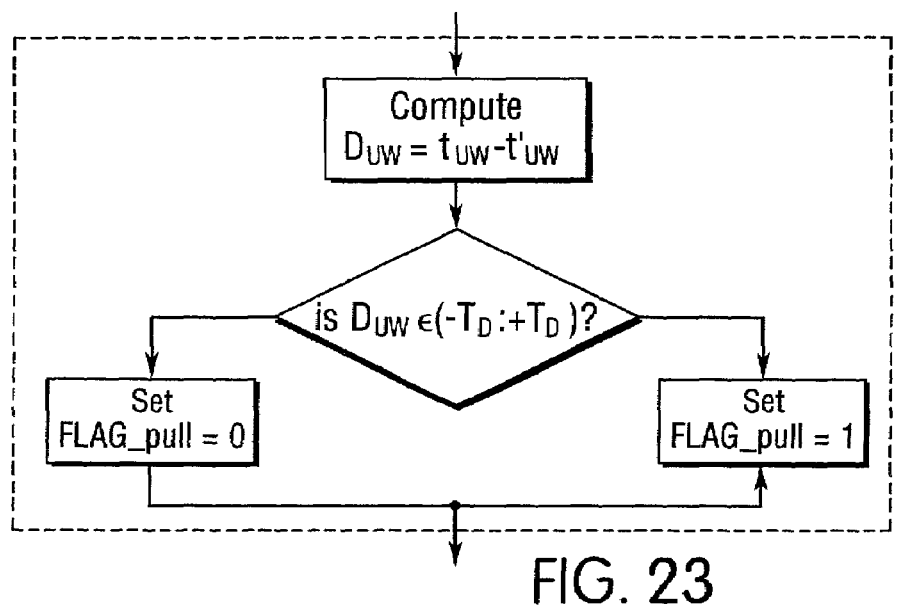
FIG. 23 is a further illustration of an example of the coarse VCO frequency pull-up computations performed in the corresponding step in the flowchart of FIG. 22.
Figure 24:
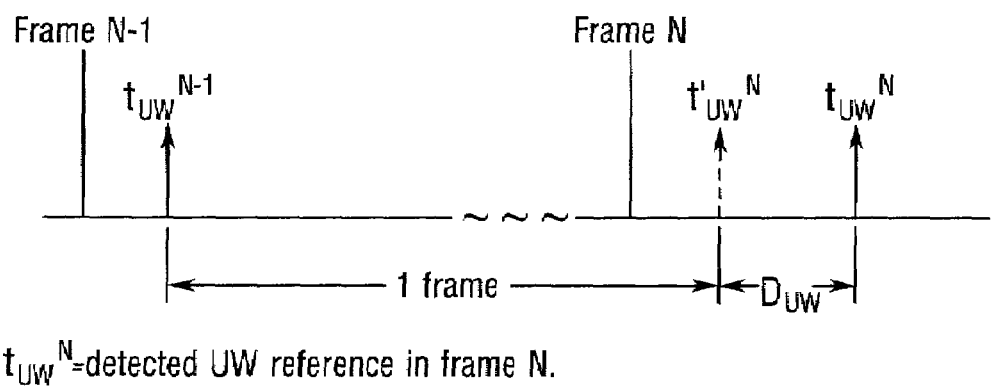
FIG. 24 is a timeline illustrating an example of how the unique word delta ($D_{UW}$) is calculated by the coarse VCO frequency pull-up block shown in FIG. 3.

The coarse VCO frequency pull-up computations 392 will now be described more fully. As illustrated in FIGS. 23 and 24, a time difference ($D_{UW}$) is calculated between the expected start of the unique word ($t'_{UW}$), and the actual start of the unique word ($t_{UW}$). The expected start of the unique word is calculated based on the current VCO frequency. The actual start of the unique word is received from the time estimation block 158. If the absolute value of the time difference ($D_{UW}$) is less than some threshold ($T_D$), which may be, for instance, ⅙ of a symbol time, than the pull-up procedure has completed, and FLAG_pull is set to 1.

At step 390, the VCO frequency adjustment is calculated. If Flag_aq is equal to 1, then the VCO frequency adjustment ($f_{VCO}$) is made equal to $-D_{UW}/T_{frame}$, where $T_{frame}$ is equal to the frame duration of 3 msec. If, however, Flag_aq=0, then the VCO frequency adjustment, $f_{VCO}$ is made equal to zero as well. This is because when Flag_aq=0, the NCO frequency has not yet been determined.

Figure 25:
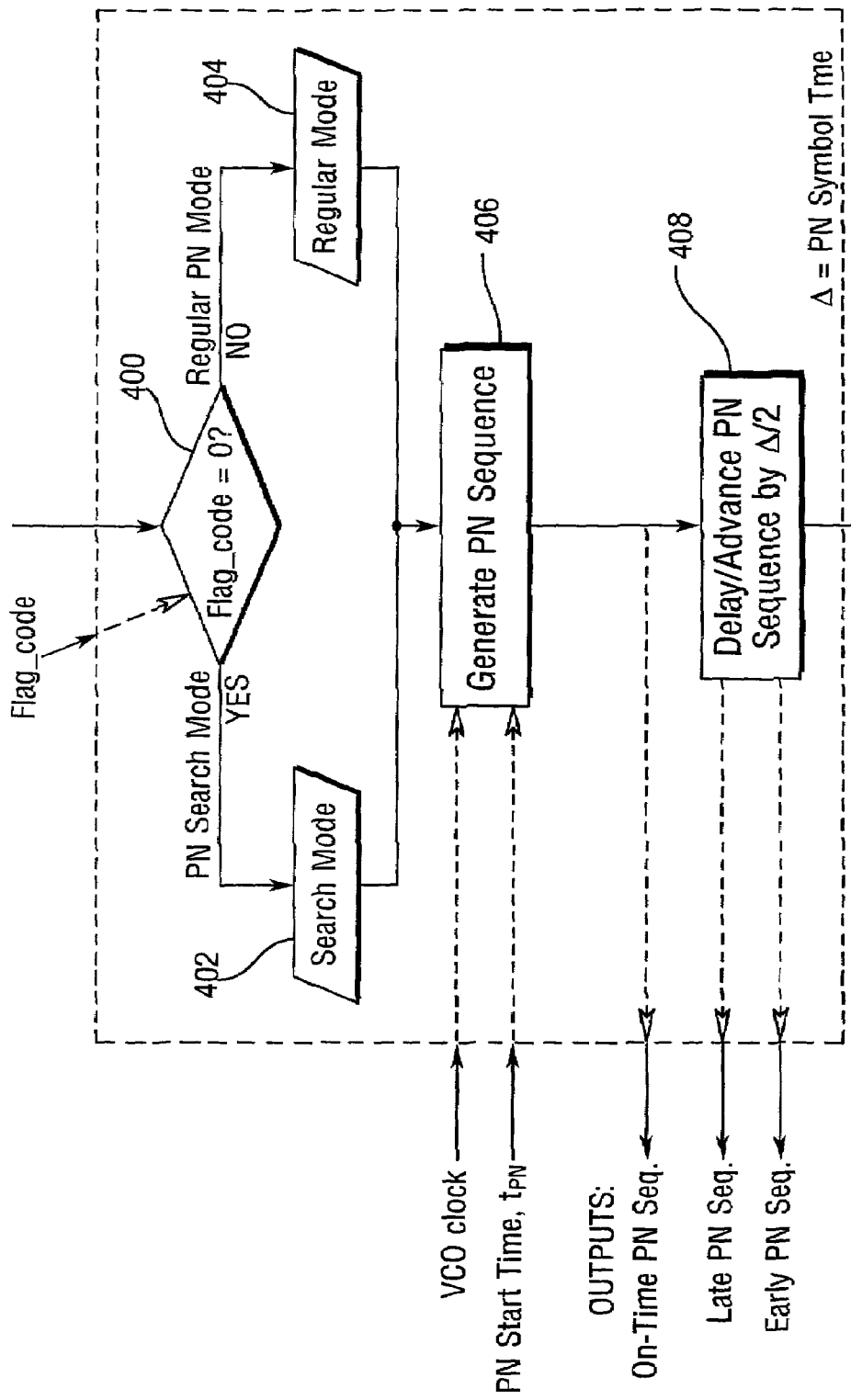
FIG. 25 is a flowchart illustrating an example of operations performed by the PN Sequence Generator block included among the components shown in FIG. 2.

The functionality of the PN Sequence Generator 146 is described more fully in the flow chart of FIG. 25. The PN Sequence Generator generates the local PN sequence which is used by the tracking block 138 and the DRO Frequency Offset Estimator and Lock Detector 134. The PN Sequence Generator 146 generates an on-time version of the PN sequence which is used by the DRO Frequency Offset Estimator and Lock Detector 134 in step 278 shown in FIG. 16. Early and late versions of the PN sequence are also generated by the PN Sequence Generator 146, and used by the tracking block 138. The PN Sequence Generator 146 operates in one of two modes, determined by the status of the code flag (FLAG_code) produced by the Mode Selection Control block 140. As shown in FIG. 25, the first step 400 is to test the status of the code flag (FLAG_code). If FLAG_code is equal to zero, then the PN Sequence Generator 146 operates in PN Search Mode 402. If FLAG_code is equal to one, then the PN Sequence Generator 146 operates in Regular Mode 404.

In PN Search Mode 402, the generator's shift registers are loaded with the set of initial values representing the first of 256 unique PN codes. The shift registers are loaded once per incoming frame in Search Mode 402. The PN Sequence Generator produces the same PN code each frame as long as the generator 146 is in Search Mode 402. In Regular Mode 404, the generator shift registers are loaded with the initial set of values. The generator then generates all 256 PN codes, and is reloaded with the initial set of values once every 256 frames. Thus, in regular mode 404, the generator produces 256 PN codes and delivers one code per frame for 256 frames. At step 406 the generator 146 generates the PN sequence. The generator 146 initially receives the PN starting time ($t_{PN}$) from the time estimation block 158. Once the beacon demodulator is in tracking mode, the generator 146 calculates the starting time from the VCO clock 122. In tracking mode, a new PN code is produced every 3 msec worth of VCO clock ticks. At step 408, the on time PN sequence is advanced and delayed by ½ PN symbol time in order to generate the early and late PN sequences. The outputs of the PN Sequence Generator 146 are the on-time, early, and late PN sequences.

Figure 26:
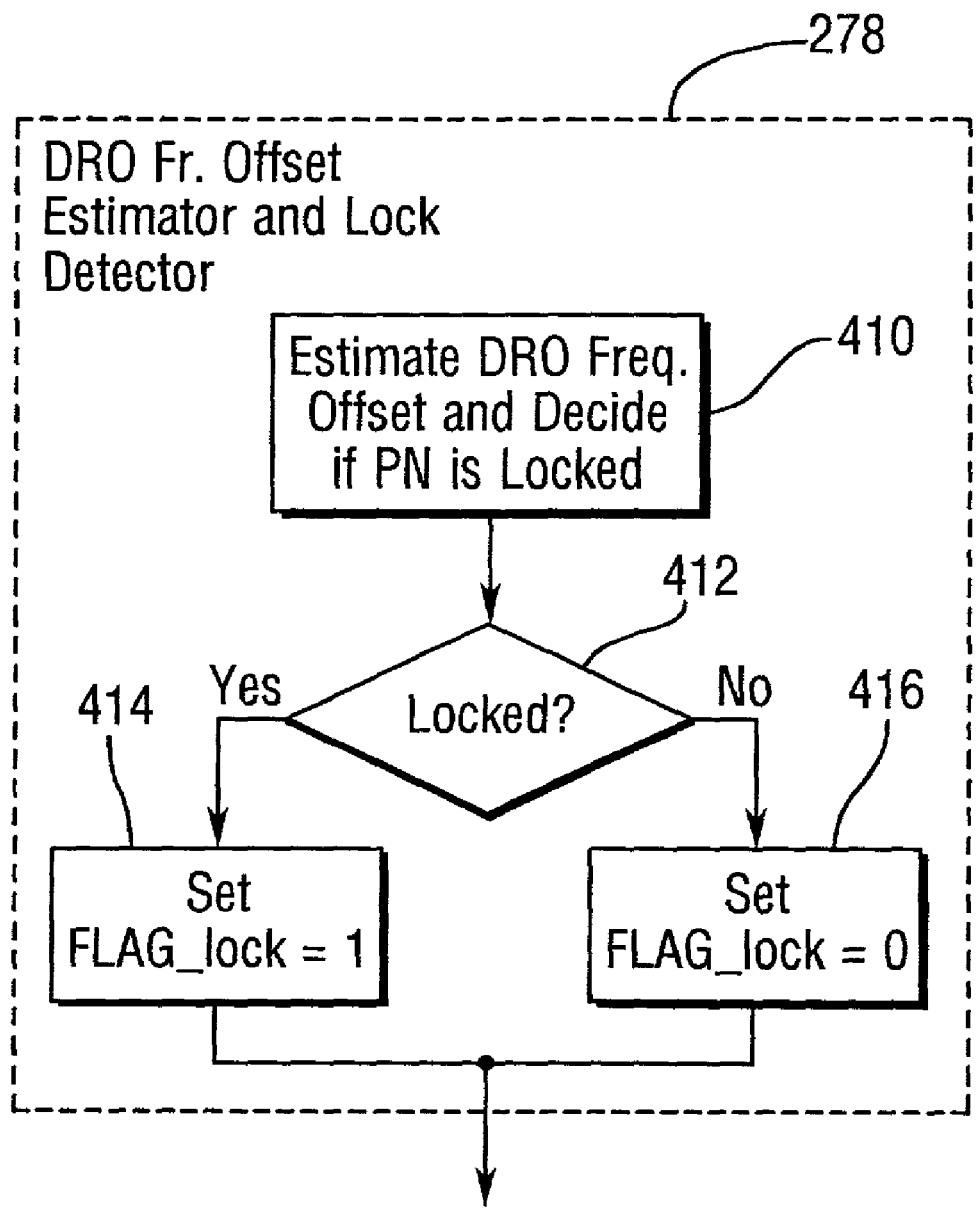
FIG. 26 is a flowchart illustrating an example of operations performed by the DRO Frequency Offset Estimator and Lock Detector block included among the components shown in FIG. 2.

The DRO Frequency Offset Estimator and Lock Detector step 278 of FIG. 16 is shown in greater detail in FIG. 26. During the first step 410 the DRO offset frequency is estimated within the DRO Frequency Offset Estimator and Lock Detector block 134. At step 412, if the lock detector 232 determined that the system is locked onto the incoming PN sequence, then the lock flag (FLAG_lock) is set equal to one at step 414. Otherwise, if the system is not locked, then the lock flag is set to zero at step 416. The lock flag (FLAG_lock) is sent from DRO Frequency Estimator and Lock Detector block 134 to Mode Selection Control block 140. The lock flag is also used internally within block 134, being sent from Lock Detector block 232 to Frequency Estimator block 234.

Figure 27:
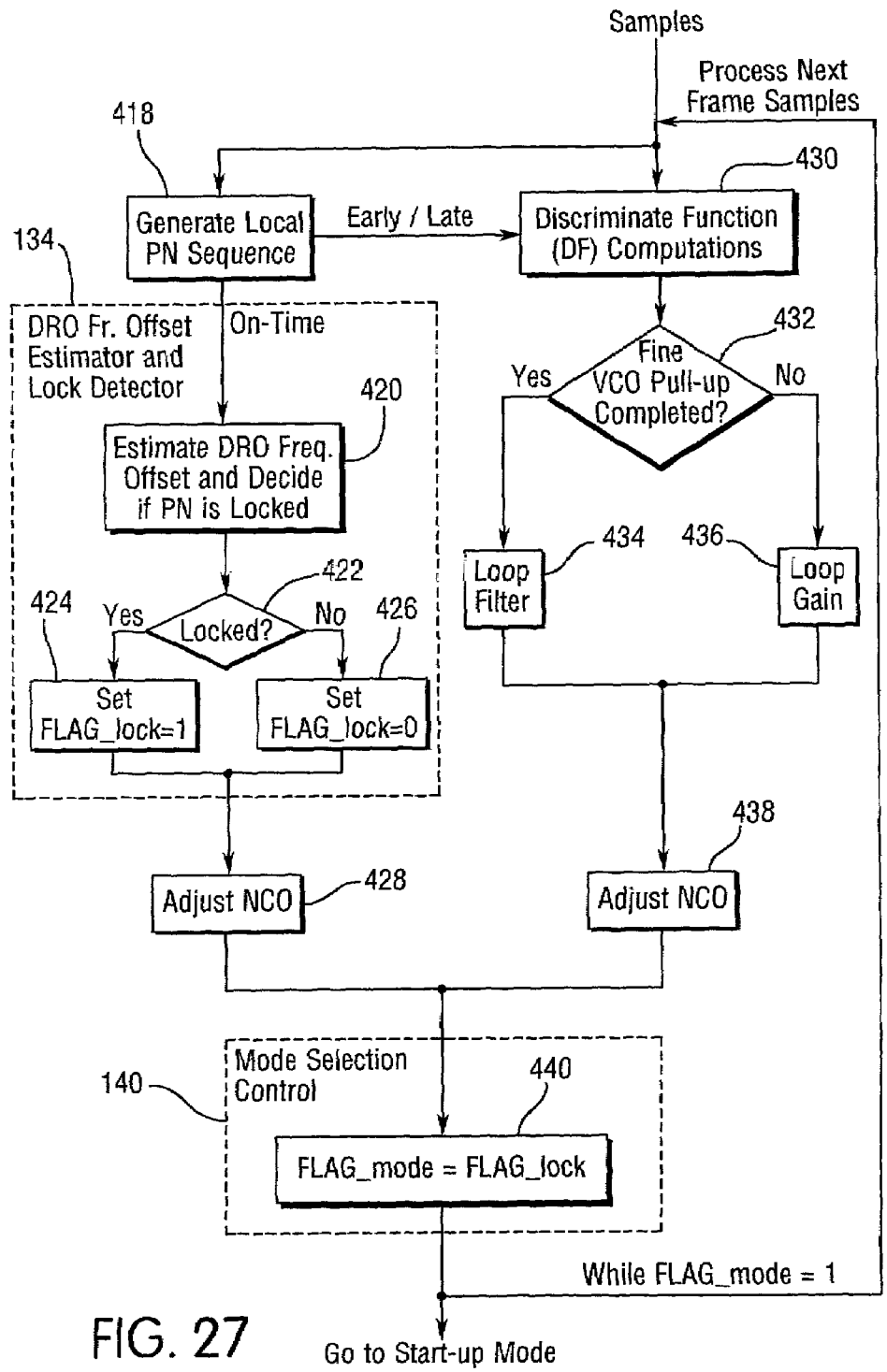
FIG. 27 is a flowchart illustrating an example of operations performed by the components shown in FIG. 2 during a tracking mode.

Once the acquisition mode is completed and the conditions necessary for tracking mode have been met (Coarse VCO frequency pull-up is complete and lock detector 232 detects lock), the system switched to tracking mode. The program flow of tracking mode is show in FIG. 27. Tracking mode is similar to acquisition mode in that the VCO pull up and DRO frequency offset processes happen in parallel. Incoming samples continue to be received at both the tracking block 138 and the DRO Frequency Offset Estimator and Lock Detector 134. On-time, early and late PN sequences are generated at step 418 (in PN Sequence Generator 146). The incoming samples and on-time PN sequence are received by the DRO Frequency Offset Estimator and Lock Detector 134. At step 420, the DRO frequency offset is calculated. If lock is detected 422, then the lock flag is set to one at step 424. If lock is not detected, then the lock flag is set to zero 426. Finally, the NCO frequency is adjusted at step 428.

At the same time, incoming samples and the early and late PN sequences are delivered to the discriminate function block 186. The Discriminate Function Computations occur at step 430. The discriminate functions were described above and in FIGS. 7 and 8. At step 432 the tracking control block 184 determines if fine VCO pull-up has been completed. If it has, then the $3^{rd}$ order DLL loop filter 192 is enabled at step 434. Otherwise, a simple gain loop 190 is enabled at step 436. At step 438 the VCO frequency is adjusted. Finally, at step 440, the status of the lock flag (FLAG_lock) is tested. If the lock flag is still set, then the mode flag (FLAG_mode) continues to be set, the system remains in tracking mode and the next frame of samples are processed. If, however, the lock flag (FLAG_lock) was set to zero, indicating that the system is no longer locked onto the incoming PN sequence, then the system returns to the acquisition mode.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included in the scope of this invention as defined in the following claims.

What is claimed is:

1. A method of determining a frequency at which a terminal transmits a transmission signal, said terminal comprising a receiver including a delay lock loop circuit, the method comprising:

receiving an input signal at said receiver;
sampling said signal at a clock rate to generate signal samples;
providing said signal samples to said delay lock loop circuit, wherein said delay look loop circuit comprises at least a third order loop and a low order gain loop;
controlling said delay lock loop circuit to provide an output representing a phase delay of the received signal, and initially using said low order gain loop and subsequently using said at least third order loop to provide said output;
adjusting the clock rate based on said phase delay;
determining said frequency at which said terminal transmits said transmission signal based on said phase delay; and
determining a difference between said frequency and an expected frequency; and
wherein the step of controlling said delay lock loop further comprises using said low order gain loop until said difference is less than a threshold value, and subsequently using said at least third order loop.

2. The method of claim 1, wherein said input signal comprises synchronization information in discontinuous time slots.

3. The method of claim 1 wherein said controlling step uses said low order gain loop for a set period of time.

4. A method of determining whether a receiver of a satellite terminal is looked onto an incoming communications signal, the signal comprising a series of digital samples generated at a sampling rate, and a plurality of frames each having one out of a series of unique phase signals time division multiplexed into at least one time slot of the frame, the plurality of frames forming a superframe, such that the series of unique phase signals repeats in each subsequent superframe, the method comprising:
generating local phase signals substantially identical to the series of phase signals in the incoming signal;
delivering a combination signal representing a combination of the incoming signal and the local phase signals to a fast Fourier transform (FFT) circuit, the FFT circuit generating an output based on said combination signal;
determining whether the satellite terminal is locked onto the incoming signal based on the output of the FFT circuit; and
determining an offset between the frequency of the incoming signal and the sampling rate based on the output of the FFT circuit, and adjusting the sampling rate based on said offset.

5. The method of claim 4, wherein the delivering step includes multiplying said incoming signal and said local phase signals to generate a product signal.

6. The method of claim 5, wherein the delivering step includes decimating said product signal to create said combination signal.

7. A system for tracking a frequency at which a transmitter transmits a signal, said signal comprising synchronization information in discontinuous time slots, said system comprising:

a receiver for receiving said signal;
a local signal generator for generating an early local signal and a late local signal at a local frequency, said early local signal being substantially similar to said synchronization information offset forward in time, said late local signal being substantially similar to said synchronization information offset backward in time;
a discriminator for correlating said signal against said early local signal and for correlating said signal against said late local signal, and for generating a discriminator output representative of the difference between the two correlations;
a delay lock loop circuit for receiving said discriminator output, wherein said delay lock loop circuit generates an output which is used to adjust said local frequency, and wherein said delay lock loop circuit comprises at least a third order tracking loop and a low order gain loop, and said delay lock loop circuit initially uses said low order gain loop and subsequently uses said at least third order tracking loop to provide said output; and
a frequency offset determining circuit adapted to determine a difference between the frequency of said signal and an expected frequency; and
wherein said delay lock loop circuit uses said simple gain loop until said difference is less than a threshold value.

8. The system of claim 7, wherein said delay lock loop circuit uses said low order gain loop for a set period of time.

9. A system for determining whether a receiver of a satellite terminal is locked onto an incoming communications signal, the signal comprising a plurality of frames each having one out of a series of unique phase signals time division multiplexed into at least one time slot of the frame, the plurality of frames forming a superframe, such that the series of unique phase signals repeats in each subsequent superframe, the system comprising:
a sampling circuit adapted to sample the incoming communication signal at a sampling rate and for producing a series of samples at the sampling rate;
a local signal generator adapted to generate local phase signals substantially identical to the series of unique phase signals in the incoming signal at the sampling rate;
a fast Fourier transform (FFT) circuit adapted to receive a combination signal representing a combination of the samples and the local phase signals;
a lock detector adapted to determine whether the satellite terminal is locked onto the incoming communication signal based on the output of the FFT circuit;
a decimator adapted to decimate said combination signal before said combination signal is received by said FFT circuit: and
an offset estimator adapted to determining an offset between the frequency of the incoming communication signal and the sampling rate based on the output of the FFT circuit, and to adjust the sampling rate based on the offset.

* * * * *